(12) United States Patent
Cohen

(10) Patent No.: US 11,610,276 B1
(45) Date of Patent: Mar. 21, 2023

(54) METHODS AND APPARATUS FOR AUTOMATED FOOD PREPARATION

(71) Applicant: Now Cuisine, Inc., Dallas, TX (US)

(72) Inventor: Adam Cohen, Dallas, TX (US)

(*) Notice: Subject to any disclaimer, the term of this patent is extended or adjusted under 35 U.S.C. 154(b) by 0 days.

(21) Appl. No.: 16/870,088

(22) Filed: May 8, 2020

Related U.S. Application Data

(63) Continuation-in-part of application No. 16/182,563, filed on Nov. 6, 2018, now abandoned, and a continuation-in-part of application No. 15/805,074, filed on Nov. 6, 2017, now abandoned, said application No. 16/182,563 is a continuation-in-part of application No. 15/805,074, filed on Nov. 6, 2017, now abandoned, and a continuation-in-part of application No. PCT/US2017/060253, filed on Nov. 6, 2017.

(60) Provisional application No. 62/845,000, filed on May 8, 2019, provisional application No. 62/724,019, filed on Aug. 28, 2018, provisional application No. 62/670,043, filed on May 11, 2018, provisional
(Continued)

(51) Int. Cl.
| | |
|---|---|
| *G06Q 50/12* | (2012.01) |
| *A47J 36/32* | (2006.01) |
| *A23L 5/00* | (2016.01) |
| *A47J 27/18* | (2006.01) |
| *G06Q 10/0836* | (2023.01) |
| *G06Q 10/0631* | (2023.01) |
| *G06Q 10/087* | (2023.01) |
| *G06Q 30/018* | (2023.01) |
| *G06Q 10/0832* | (2023.01) |
| *G06K 7/14* | (2006.01) |
| *G06K 7/10* | (2006.01) |

(52) U.S. Cl.
CPC ............ *G06Q 50/12* (2013.01); *A23L 5/00* (2016.08); *A47J 27/18* (2013.01); *A47J 36/32* (2013.01); *G06K 7/10366* (2013.01); *G06K 7/1413* (2013.01); *G06Q 10/06312* (2013.01); *G06Q 10/06315* (2013.01); *G06Q 10/06316* (2013.01); *G06Q 10/087* (2013.01); *G06Q 10/0832* (2013.01); *G06Q 10/0836* (2013.01); *G06Q 30/0185* (2013.01); *A23V 2002/00* (2013.01)

(58) Field of Classification Search
CPC .................................................. G06Q 10/0833
See application file for complete search history.

(56) References Cited

U.S. PATENT DOCUMENTS

| | | | | |
|---|---|---|---|---|
| 5,172,328 A | * | 12/1992 | Cahlander | ............... A47J 27/14 700/211 |
| 2014/0324607 A1 | * | 10/2014 | Frehn | ..................... G06Q 50/12 705/15 |

(Continued)

OTHER PUBLICATIONS

C. Elbrechter, J. Maycock, R. Haschke and H. Ritter, "Discriminating liquids using a robotic kitchen assistant," 2015 IEEE/RSJ International Conference on Intelligent Robots and Systems (IROS), 2015, pp. 703-708, doi: 10.1109/IROS.2015.7353449. (Year: 2015).*

*Primary Examiner* — Emmett K. Walsh

(57) ABSTRACT

Methods and apparatus for automatically preparing food for consumption in which preparation comprises dispensing, manipulation, heating, and other operations using a wide variety of ingredients. The methods and apparatus described use ingredients efficiently and maintain their quality, while avoiding contact between ingredients and apparatus to minimize the risk of system contamination.

19 Claims, 15 Drawing Sheets

Related U.S. Application Data application No. 62/588,913, filed on Nov. 20, 2017, provisional application No. 62/522,671, filed on Jun. 20, 2017, provisional application No. 62/471,957, filed on Mar. 15, 2017, provisional application No. 62/456,008, filed on Feb. 7, 2017, provisional application No. 62/417,336, filed on Nov. 4, 2016.

(56) References Cited

U.S. PATENT DOCUMENTS

| | | | |
|---|---|---|---|
| 2014/0330739 A1* | 11/2014 | Falcone | G06Q 10/08355 705/338 |
| 2015/0019354 A1* | 1/2015 | Chan | G06Q 10/109 99/325 |

* cited by examiner

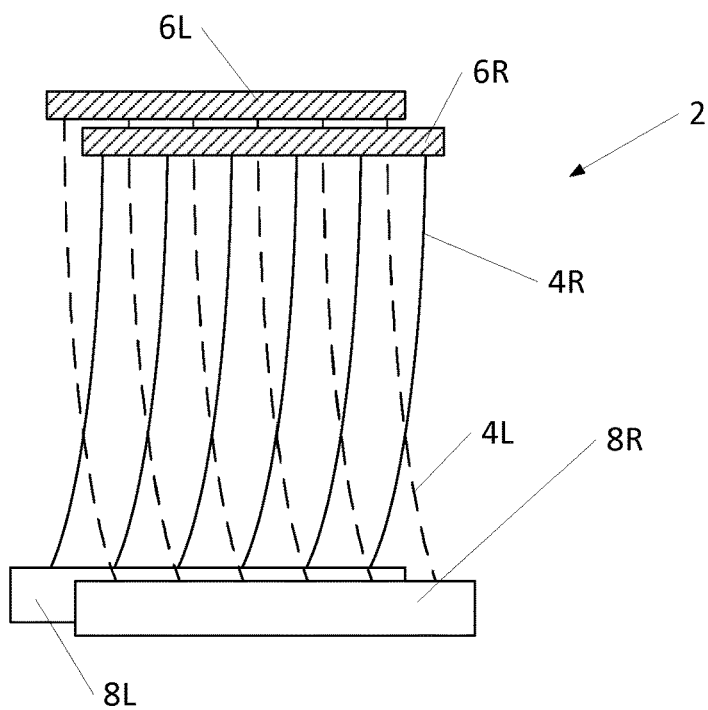
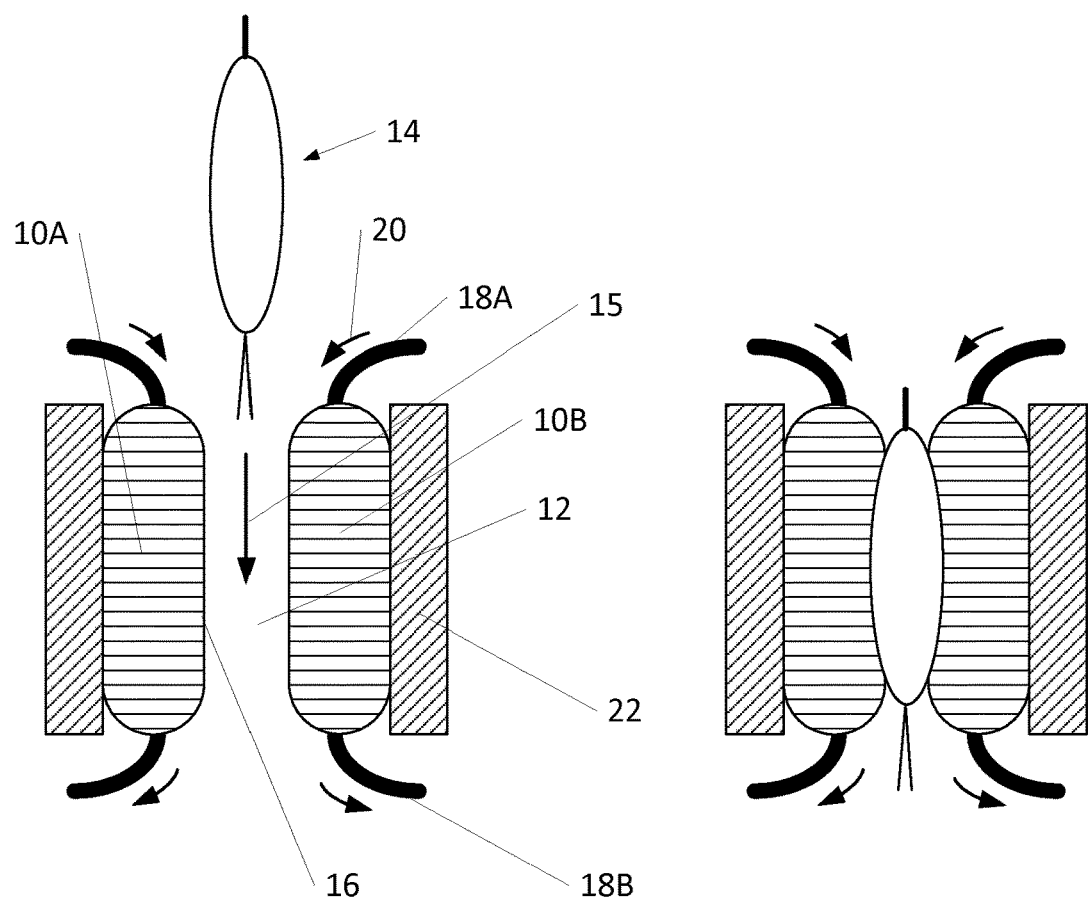
Fig. 1
Fig. 2A          Fig. 2B

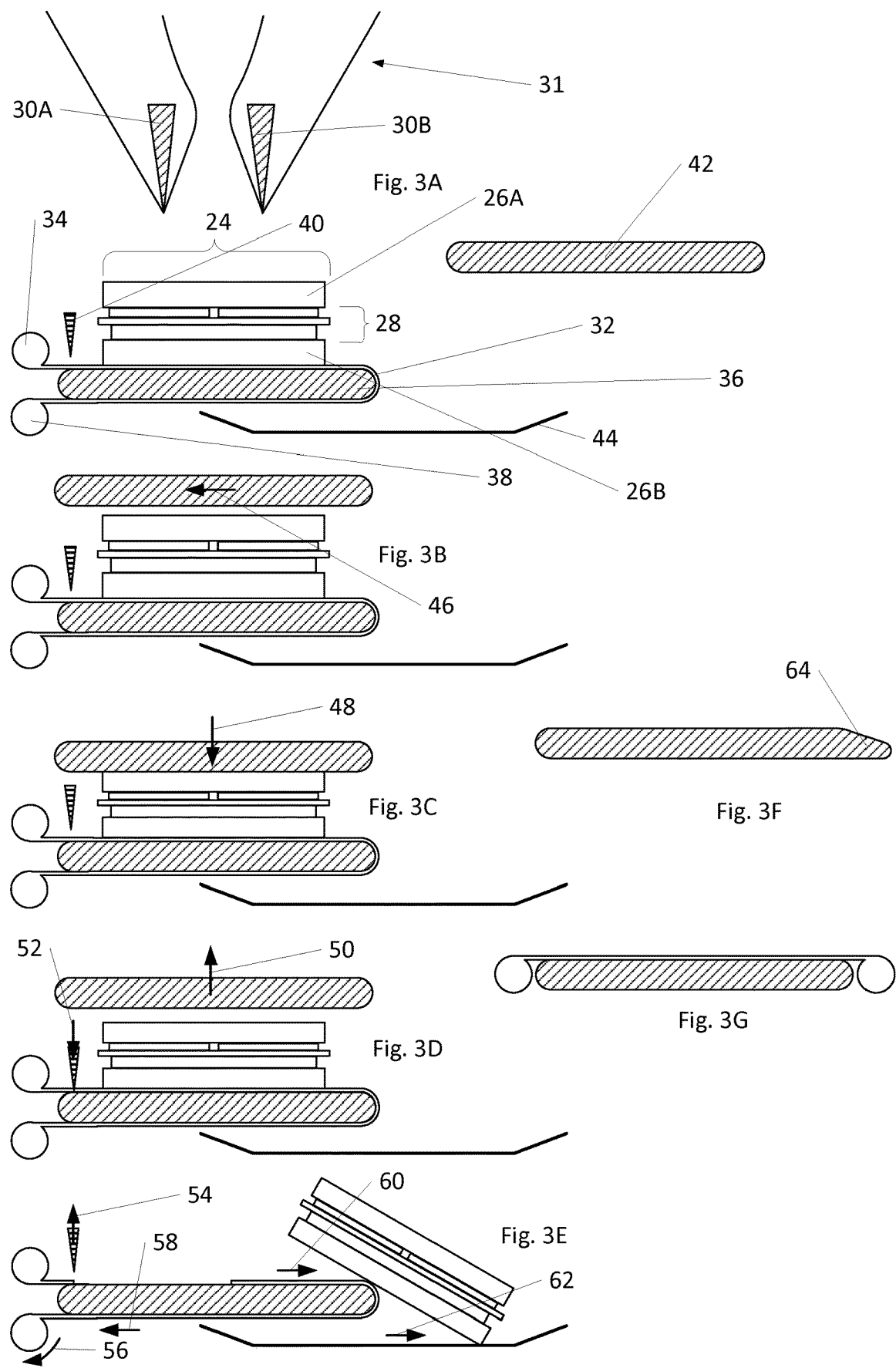

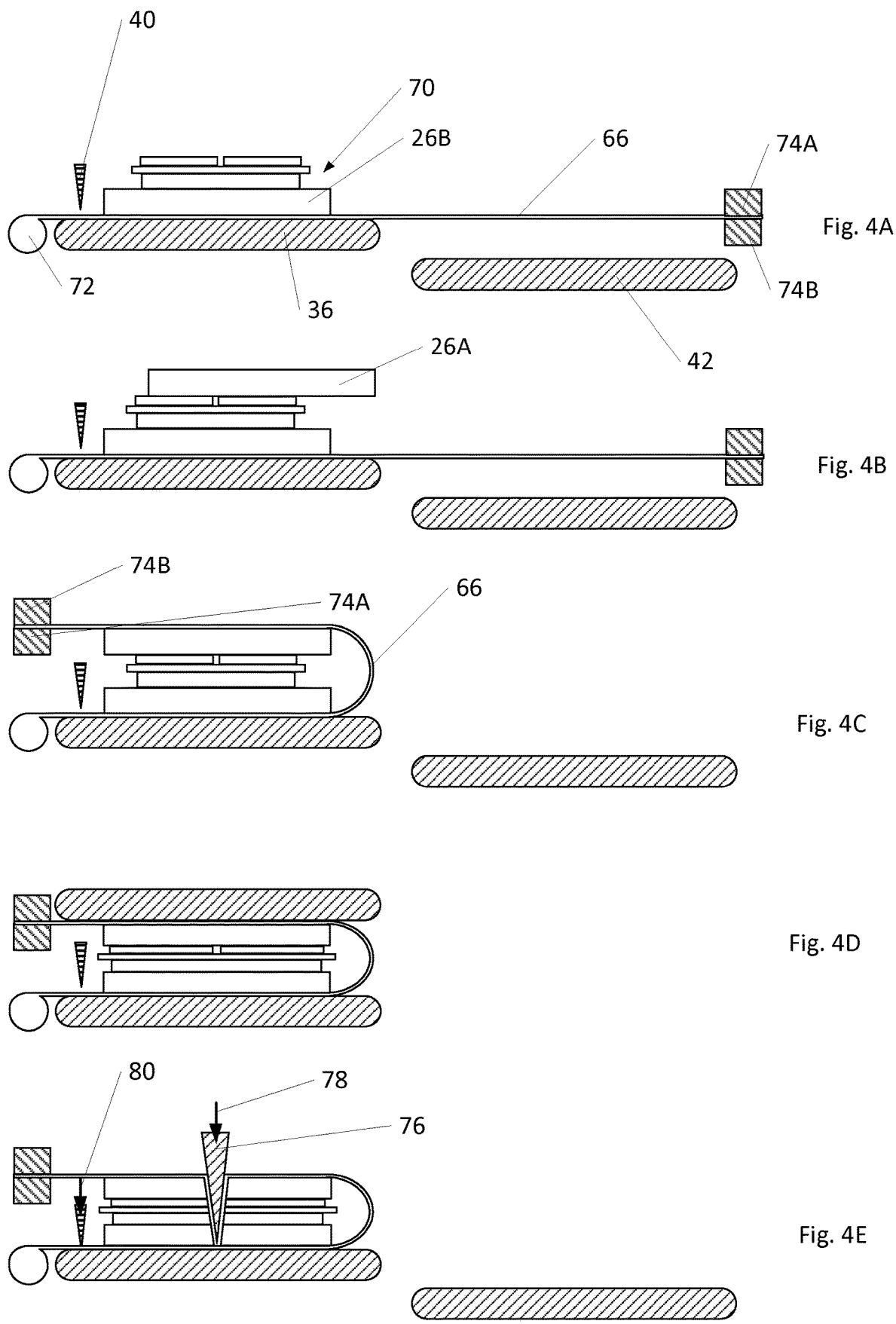

Fig. 5A
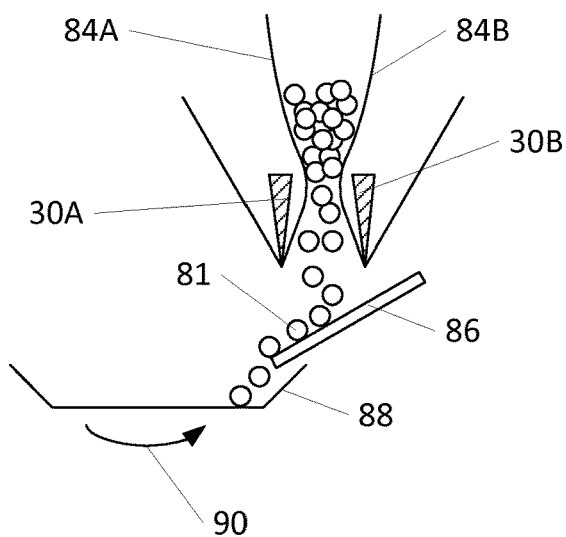
Fig. 5B
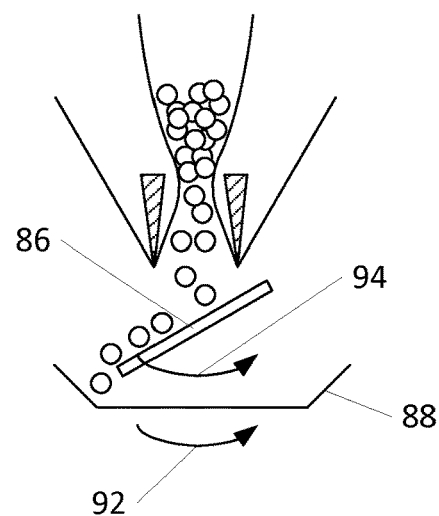
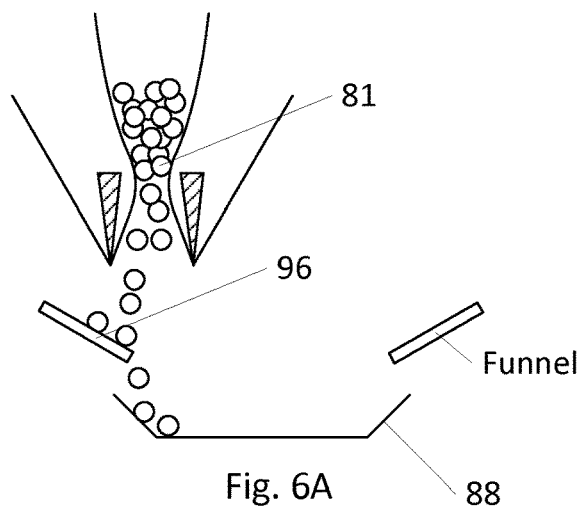
Fig. 6A
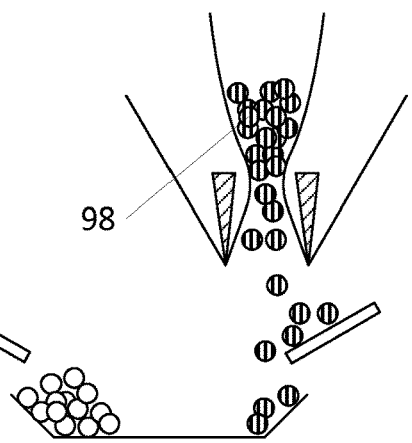
Fig. 6B
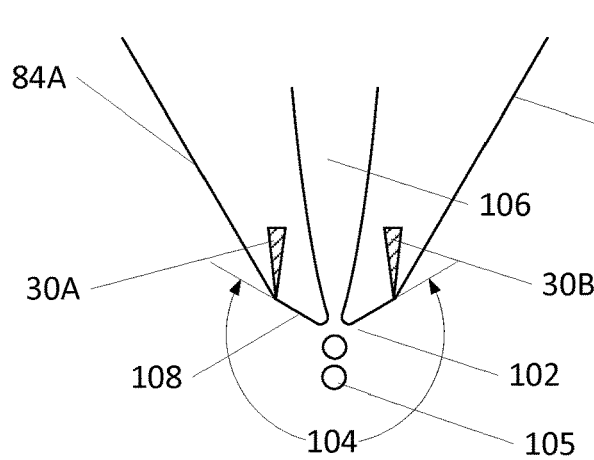
Fig. 7

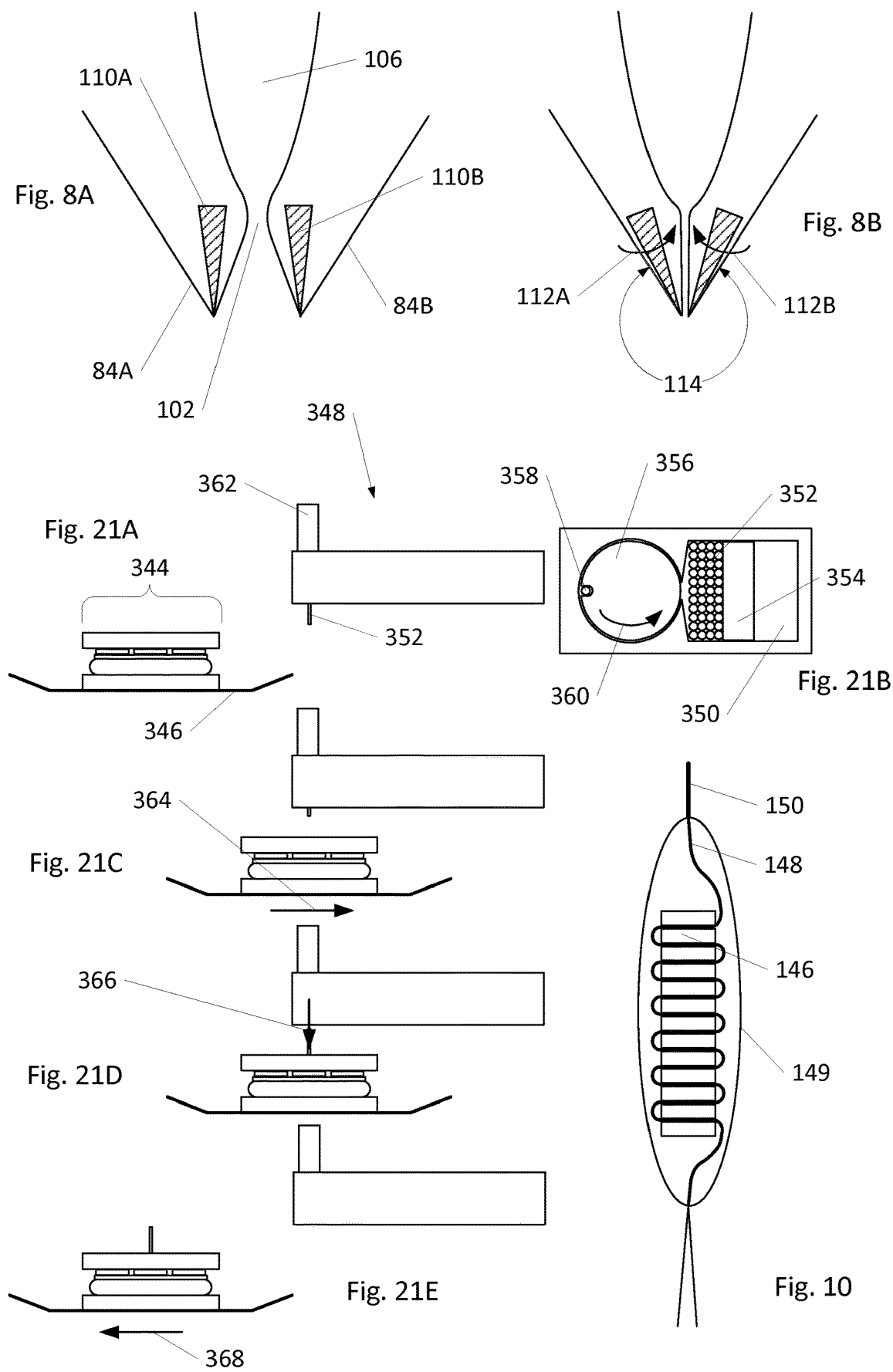

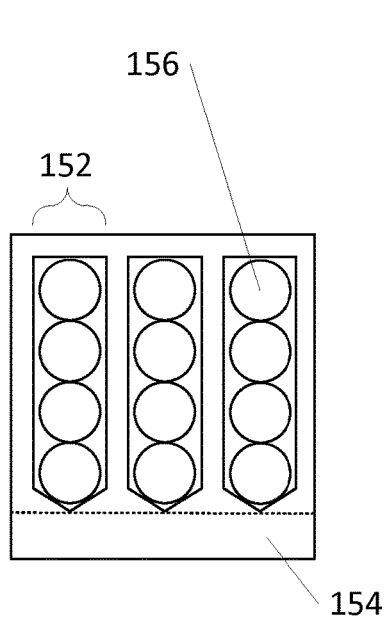
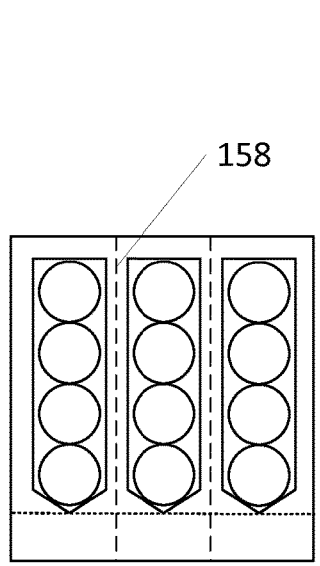
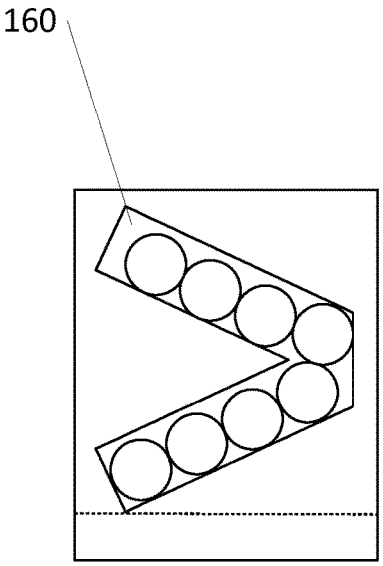
Fig. 11A      Fig. 11B      Fig. 11C
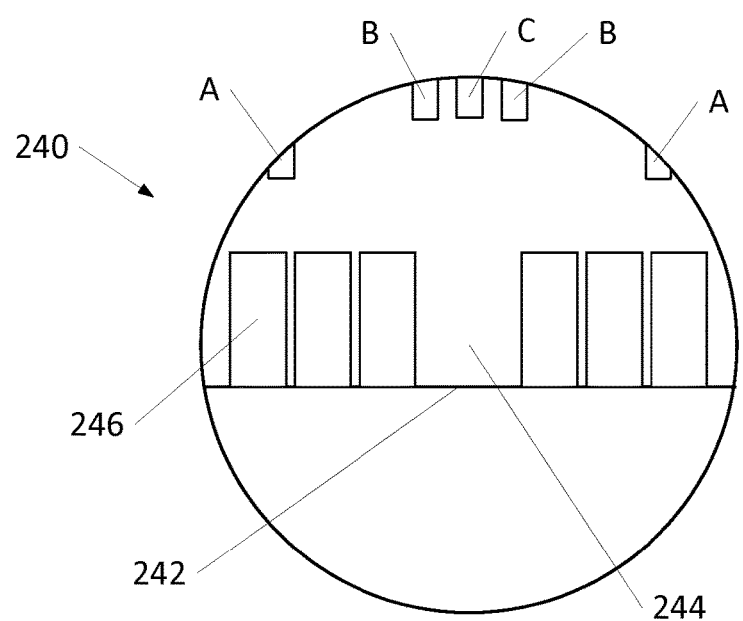
Fig. 16

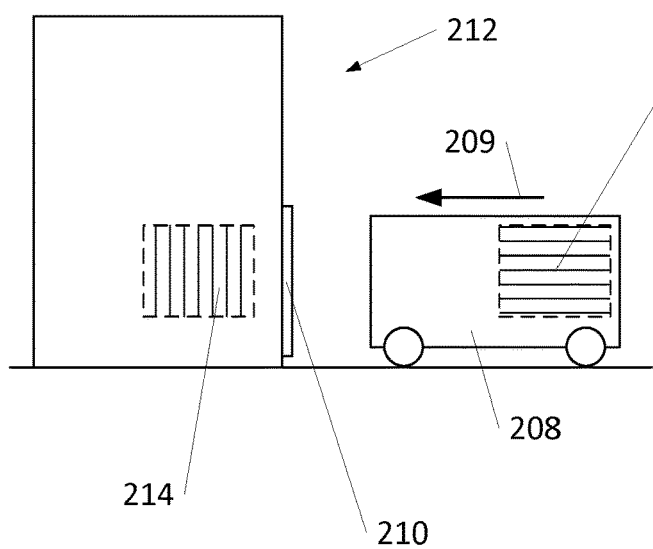
Fig. 13A
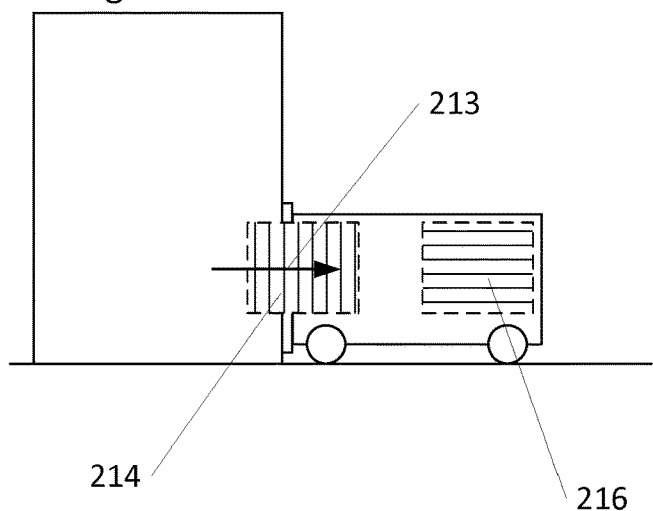
Fig. 13B
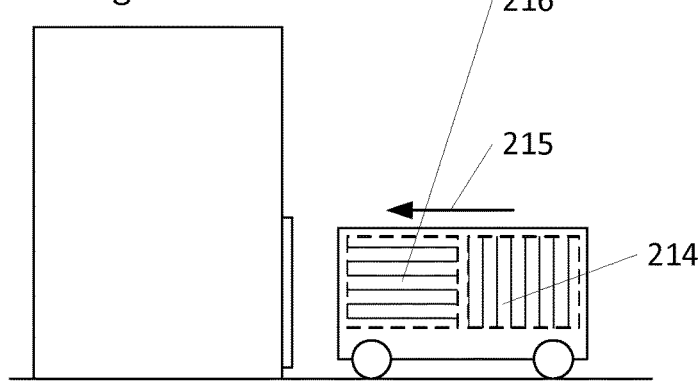
Fig. 13C
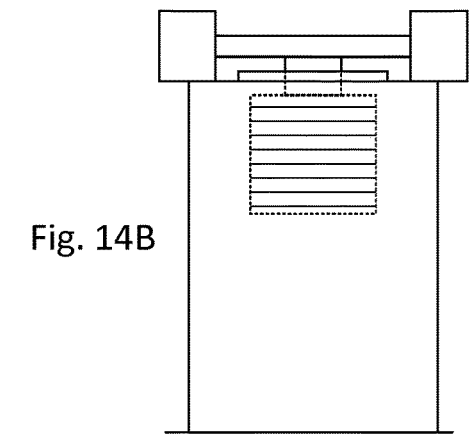
Fig. 14A
Fig. 14B
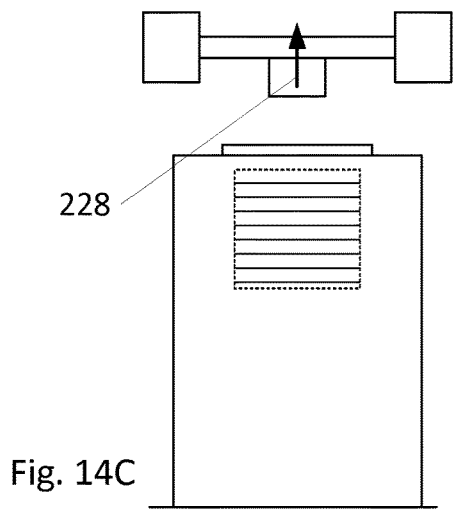
Fig. 14C

METHODS AND APPARATUS FOR AUTOMATED FOOD PREPARATION

CROSS REFERENCE TO RELATED APPLICATIONS

The table below sets forth the priority claims for the instant application along with filing dates, and patent numbers as appropriate. Each of the listed applications is incorporated herein by reference as if set forth in full herein including any appendices attached thereto.

| Application | Continuity type | App. No. | Which was filed (YYYY-MM-DD) | Which is now | Referred to in this application as the | Internal nickname |
|---|---|---|---|---|---|---|
| This application | claims benefit of | 62/845,000 | 2019 May 8 | Pending | | P8 |
| This application | is a CIP of | 16/182,563 | 2018 Nov. 6 | Pending | 563 filing | NP2 |
| This application | is a CIP of | 15/805,074 | 2017 Nov. 6 | Pending | 074 filing | PCT2 |
| 16/182,563 | is a CIP of | 15/805,074 | 2017 Nov. 6 | Pending | | NP1 |
| 16/182,563 | claims benefit of | 62/724,019 | 2018 Aug. 28 | Pending | | P7 |
| 16/182,563 | claims benefit of | 62/670,043 | 2018 May 11 | Pending | | P6 |
| 16/182,563 | claims benefit of | 62/588,913 | 2017 Nov. 20 | Pending | | P5 |
| 16/182,563 | is a CIP of | PCT/US17/60253 | 2017 Nov. 6 | Pending | | PCT1 |
| 15/805,074 | claims benefit of | 62/522,671 | 2017 Jun. 20 | Expired | | P4 |
| 15/805,074 | claims benefit of | 62/471,957 | 2017 Mar. 15 | Expired | | P3 |
| 15/805,074 | claims benefit of | 62/456,008 | 2017 Feb. 7 | Expired | | P2 |
| 15/805,074 | claims benefit of | 62/417,336 | 2016 Nov. 4 | Expired | | P1 |

FIELD OF THE INVENTION

This disclosure generally relates to the fields of robotics/automation and cooking/culinary arts.

STATEMENT OF FEDERALLY FUNDED RESEARCH

Not applicable.

SUMMARY

The automation of food preparation is of significant interest. A highly-automated food preparation system/machine/kiosk/appliance can offer significant benefits, providing a means of reducing labor that is frequently hard to find and costly and allowing installation in locations unsuitable for workers; increasing the availability of quality food and allowing access in more locations and at more times; reducing wait times; facilitating customization to individual tastes, nutritional requirements, and dietary restrictions; reducing the risk of foodborne illness caused by restaurant workers; increasing repeatability by making recipes more quantitative and ensuring they are followed accurately; etc.

Key issues associated with automated food preparation may be addressed by packaging, providing, and storing ingredients within sealed flexible packages (pouches)—with each pouch containing the amount of an ingredient required for a particular recipe, given the number of servings to be prepared—rather than in bulk form (e.g., contained within a large bin or hopper).

It is an object of some embodiments of the invention to assure high ingredient quality by protecting ingredients before use from exposure to the environment, since air and moisture can cause oxidation, desiccation, sogginess, staleness, and other degradation which reduce palatability, and require frequent and wasteful restocking with fresh ingredients.

It is an object of some embodiments of the invention to assure food safety and hygiene by minimizing or eliminating durable components of the apparatus coming into direct contact with ingredients, since otherwise there is danger (without perfect cleaning, which is difficult to achieve) of cultivating harmful microbes (e.g., within residues of food on surfaces) which can then enter otherwise safe food, or of cross-contamination from other ingredients (including allergens such as peanuts). Also, if ingredients are not well protected, insects and other vermin may infest them. In general, the invention avoids contact between apparatus and ingredients, and avoids unintended contact between different ingredients.

It is an object of some embodiments of the invention to minimize human contact with ingredients, and minimize human contact, when there is a concern about contagion, between a customer obtaining food and other people.

It is an object of some embodiments of the invention to allow high quality, tasty food to be provided in locations and at times of day that would otherwise not be possible.

It is an object of some embodiments of the invention to offer meal variety by providing dispensing methods and apparatus that are compatible with a very large range of ingredients, including those that might be too delicate, too large, too moist, etc. to dispense by other methods.

It is an object of some embodiments of the invention to provide efficient and non-wasteful dispensing of ingredients by such that virtually the entire amount of ingredient provided for a particular meal is delivered and there is little or nothing left behind It is an object of some embodiments of the invention to minimize maintenance of systems which automate food preparation, and reduce the need for human intervention.

Other objects and advantages of various embodiments of the invention will be apparent to those of skill in the art upon review of the teachings herein. The various embodiments of the invention, set forth explicitly herein or otherwise ascertained from the teachings herein, may address one or more of the above objects alone or in combination, or alternatively may address some other object ascertained from the teachings herein. It is not necessarily intended that all objects be addressed by any single aspect of the invention even though that may be the case with regard to some aspects.

In a first aspect of the invention a method for method for determining an available meal pickup time for a user of an automated food system, includes: (a) determining the ingredients needed for a meal; (b) determining a fetching time for each ingredient; (c) determining a dispensing time for each ingredient; (d) summing the fetching and dispensing times for all ingredients; (e) determining a heating time for each ingredient needing heating; (f) calculating total meal preparation time R, considering any ingredients which are heated while fetching or dispensing other ingredients; (g) generating a candidate start time; (h) adding R to the candidate start time to obtain a corresponding candidate pickup time; (i) accepting the candidate pickup time after verifying that the interval between the candidate start time and pickup time does not overlap any previously-scheduled meal preparation interval; (j) repeating steps (g)-(i) for any desired additional candidate start times; (k) displaying candidate pickup times to the user; (l) inputting a requested pickup time; (m) starting to prepare a meal at the start time corresponding with the requested pickup time; whereby the user is provided with a reliable and accurate pickup time for her meal.

Numerous variations of the first aspect of the invention are possible and include, for example: 1) delaying the start time if the user is not able to access the automated food system at or within a short time after the requested pickup time; 2) variation (1) wherein the amount of the delaying is calculated so as not to overlap any previously-scheduled meal preparation interval.

In a second aspect of the invention a method for restocking with ingredients an automated food system comprising a plurality of ingredient-carrying modules, includes: (a) determining the space available for ingredients in each of the modules; (b) transferring ingredients from the module having the most available space to at least one other module; (c) removing the module with the most available space from the system; (d) accepting into the food system a module containing ingredients for use; whereby the system is restocked with ingredients.

Numerous variations of the second aspect of the invention are possible and include, for example wherein the accepting comprises validating that the module has not been tampered with and that the food therein has been maintained at a safe temperature.

In a third aspect of the invention a method for heating or cooling food, includes: (a) providing at least one liquid container comprising at least one flexible, thermally conductive wall; (b) filling the liquid container with a liquid under pressure, the pressure source selected from the group consisting of: 1) hydrostatic pressure, 2) externally-applied mechanical pressure, and 3) pressure produced by a gas, or combinations thereof; (c) positioning food adjacent to the at least one flexible wall; (d) allowing the pressure of the liquid to conform the at least one flexible wall to the food; (e) heating or cooling the liquid within the at least one container; whereby close contact between the at least one flexible wall and the food is established by the liquid pressure and efficient thermal transfer between the liquid and the food is obtained.

Numerous variations of the third aspect of the invention are possible and include, for example: 1) wherein the container comprises an elastomeric bladder; 2) wherein the flexible, thermally conductive wall comprises a thin silicone elastomer wall; 3) wherein the food is contained within a flexible package; 4) wherein the liquid has a boiling point substantially higher than pure water; 5) 21 wherein the food is heated to a temperature that produces a Maillard reaction; 6) wherein the method is performed under the direction of a controller that implements the providing, filling, positioning, allowing, and heating or cooling within an automated meal preparation system.

In a fourth aspect of the invention a storage module for transporting food to an automated food system, includes: (a) a thermally-insulating enclosure; (b) at least one temperature sensor; (c) enclosure locking means; (d) data handling means selected from the group consisting of 1) data logging means, 2) wireless data transmission means, or a combination thereof; (e) a power source for the operation of the module.

Numerous variations of the fourth aspect of the invention are possible and include, for example: 1) further comprising means for determining current location; 2) further comprising at least one environmental or tamper-detecting sensor; 3) further comprising a waste compartment configured to receive empty or unusable food packages; 4) further comprising an energy source that can provide power to the automated food system.

In a fifth aspect of the invention a method for determining one or more candidate meal pickup times for a user of an automated food system and automatically determining a meal preparation start time corresponding to an accepted meal pickup time, includes: (a) providing an automated food system, comprising: 1) a memory for storing: (i) information about meals that may be produced by the system; (ii) information about ingredients needed to produce the meals; (iii) process parameters to convert the ingredients into the meals; (iv) information about the state of the system, the state of the ingredients, and existing scheduled activities; 2) a supply of packaged ingredients to produce the meals; 3) automated apparatus for manipulating the ingredients in the process of producing the meals; 4) at least one container for holding at least one item selected from the group consisting of: (1) the ingredients for a selected meal, (2) a partially prepared meal, and (3) a prepared meal; 5) a controller for controlling or directing operation of the system; (b) receiving input from a user indicating interest in a selected meal; (c) looking up in the memory information about the ingredients of the selected meal; (d) determining a non-overlapping fetching time for each ingredient; (e) determining a non-overlapping dispensing time for each ingredient; (f) for any ingredient needing heating or cooling determining a non-overlapping heating or cooling time for each ingredient and for each non-overlapping combined state of the ingredients; (g) determining any non-overlapping delay times associated with scheduled system activities based at least in part on stored existing scheduled system activities; (h) calculating total meal preparation time R, by summing the results of (d)—(g); (i) generating at least one candidate meal pickup time based on R in combination with a time selected from the group consisting of: (1) a current time, and (2) an approximate meal time of interest provided by user; (j) displaying the one or more candidate meal pickup times to the user; (k) receiving an accepted meal pickup time from input provided by the user; (l) scheduling a meal preparation start time based at least in part on R and the accepted meal pickup time such that the user is provided with a reliable meal pickup time, wherein the receiving, looking up, determining, calculating, generating, displaying, receiving, and scheduling steps are directed by the controller.

Numerous variations of the fifth aspect of the invention are possible and include, for example: 1) wherein the memory further stores information about variations of the meals; 2) wherein the receiving input from a user further comprises a particular variation of that selected meal; 3) wherein the receiving input from a user further comprises information concerning an approximate meal pickup time of interest; 4) wherein the looking up in the memory further comprises information about a particular variation of a meal; 5) wherein the determining a non-overlapping fetch time is based at least in part on an order of fetching provided from the memory storing process parameters; 6) wherein the determining of a non-overlapping dispensing time is based at least in part on an order of dispensing provided from the memory storing process parameters and any parallel processing that will be implemented based on the system configuration and the state of the system; 7) further comprising a user interface, available after step (j), allowing a user to propose an alternative meal pickup time selected from the group consisting of (1) an incremental change to candidate meal pickup time, and (2) a specific pickup time, wherein in response to such input, the controller reperforms at least a portion of the determinations and calculation of (d)—(i) along with displaying one or more revised candidate pickup times around the proposed alternative pickup time that may be accepted by the user; 8) variation (A) wherein one or more of the determinations and calculation of (d)—(i) ensures that meal processing activities and candidate pickup times do not conflict with any previously-scheduled meal preparation activities or pickup times; 9) wherein the system ensures that no two meals utilize the same machine resources at the same time; 10) wherein the determining of non-overlapping fetch time for each ingredient is based at least in part on anticipated ingredient locations as derived from information selected from the group consisting of (1) current ingredient locations as stored in memory, (2) current ingredient locations as ascertained by scanning current ingredient locations, and (3) anticipated repositioning of ingredient locations resulting from existing meal orders; 11) wherein the determining of a non-overlapping dispensing time for each ingredient is based at least in part on pre-measured estimates of dispensing time along with pause times and packaging disposal times; 12) additionally comprising beginning preparation of the meal at a time selected from the group consisting of: (1) within one minute of the scheduled start time, (2) within two minutes of the scheduled start time, and (3) within five minutes of scheduled start time; 13) variation (B) additionally comprising finishing meal preparation at a time selected from the group consisting of: (1) within one minute of the accepted pickup time, (2) within two minutes of the accepted pickup time, (3) within five minutes of accepted pickup time; (4) prior to but within one minute of the accepted pickup time, (5) prior to but within two minutes of the accepted pickup time, and (6) prior to the but within five minutes of accepted pickup time; 14) additionally comprising collecting contact information for the user and sending one or more updates to the user during preparation of the meal selected from the group consisting of: (1) a notice indicating that preparation of the meal has begun, (2) a notice that preparation of the meal will be completed within a predefined period of time, (3) a notice that the preparation of the meal has been completed, (4) a notice that the start of the meal has been delayed, (5) a notice that meal completion is delayed, (6) a notice that meal completion is delayed by a specified amount, (7) a notice that meal preparation has been canceled, (8) a notice that meal preparation will be late and requesting input on whether the preparation should continue or whether it should be canceled; 15) further comprising delaying the start time if the user is not able to access the automated food system at or within a short time after the requested pickup time; 16) variation (C) wherein the amount of the delaying is calculated so as not to overlap any previously-scheduled meal preparation interval.

In a sixth aspect of the invention a method for restocking with ingredients an automated food system comprising a plurality of ingredient-carrying modules, includes: (a) providing an automated food system, comprising: 1) a memory for storing: (i) information about meals that may be produced by the system; (ii) information about ingredients needed to produce the meals, and (iv) information about the state of the system and the state of the ingredients; 2) a plurality of modules, each capable of holding a plurality of ingredients; 3) a controller; 4) automated tools for manipulating the ingredients in the process of producing the meals; (b) determining the space available for ingredients in each of the modules based on a selected one of (1) information stored in memory about ingredient locations and modules, and (2) information obtained by scanning the modules and the ingredients stored thereon; (c) transferring ingredients from at least one module to at least one other module; (d) removing the at least one module from which ingredients were transferred from the system; and (e) accepting into the automated food system at least one replacement module containing additional ingredients for use by the system, whereby the system is restocked with ingredients, and wherein the determining and transferring are directed by the controller.

Numerous variations of the sixth aspect of the invention are possible and include, for example: 1) wherein the removed at least one module has the largest amount of space; 2) wherein the accepting comprises automatically validating a safety condition selected from the group consisting of (1) the module has not been tampered with, (2) the ingredients therein have been maintained within a defined temperature, (3) required use-by dates have not been exceeded, (4) at least two of (1)-(3), and (5) all three of (1)-(3); 4) wherein at least one of the transferring of ingredients and the acceptance of the replacement module, involves a determination of the types of ingredients that are being retained by the system, the ingredients that may be subject to removal, and the types of ingredients that are being accepted by the system.

BRIEF DESCRIPTION OF THE DRAWINGS

FIG. 1 depicts a flexible package able to slice an ingredient.

FIGS. 2A-2B show an apparatus used in methods for heating or cooling.

FIGS. 3A-3G and FIGS. 4A-4E illustrate methods and apparatus for preparing a grilled sandwich.

FIGS. 5A-5B and 6A-6B depict methods and apparatus used to control the placement of ingredients.

FIG. 7 shows a modified method of dispensing.

FIGS. 8A-8B illustrate methods and apparatus involving rotating dispensing blades.

FIG. 10 illustrates an approach to dispensing a sliced food.

FIGS. 11A-11C depict specialized pouches.

FIG. 12A shows a module for transporting food while

FIGS. 13A-13C, FIGS. 14A-14C, and FIG. 15 illustrate methods and apparatus for restocking food machines.

FIG. 16 depicts a food system for an airplane.

FIGS. 21A-21E illustrate methods and apparatus for non-contact insertion of a toothpick in a food.

DETAILED DESCRIPTION OF THE EMBODIMENTS

Ingredient Processing

Figures 9A, 9B, 9C:
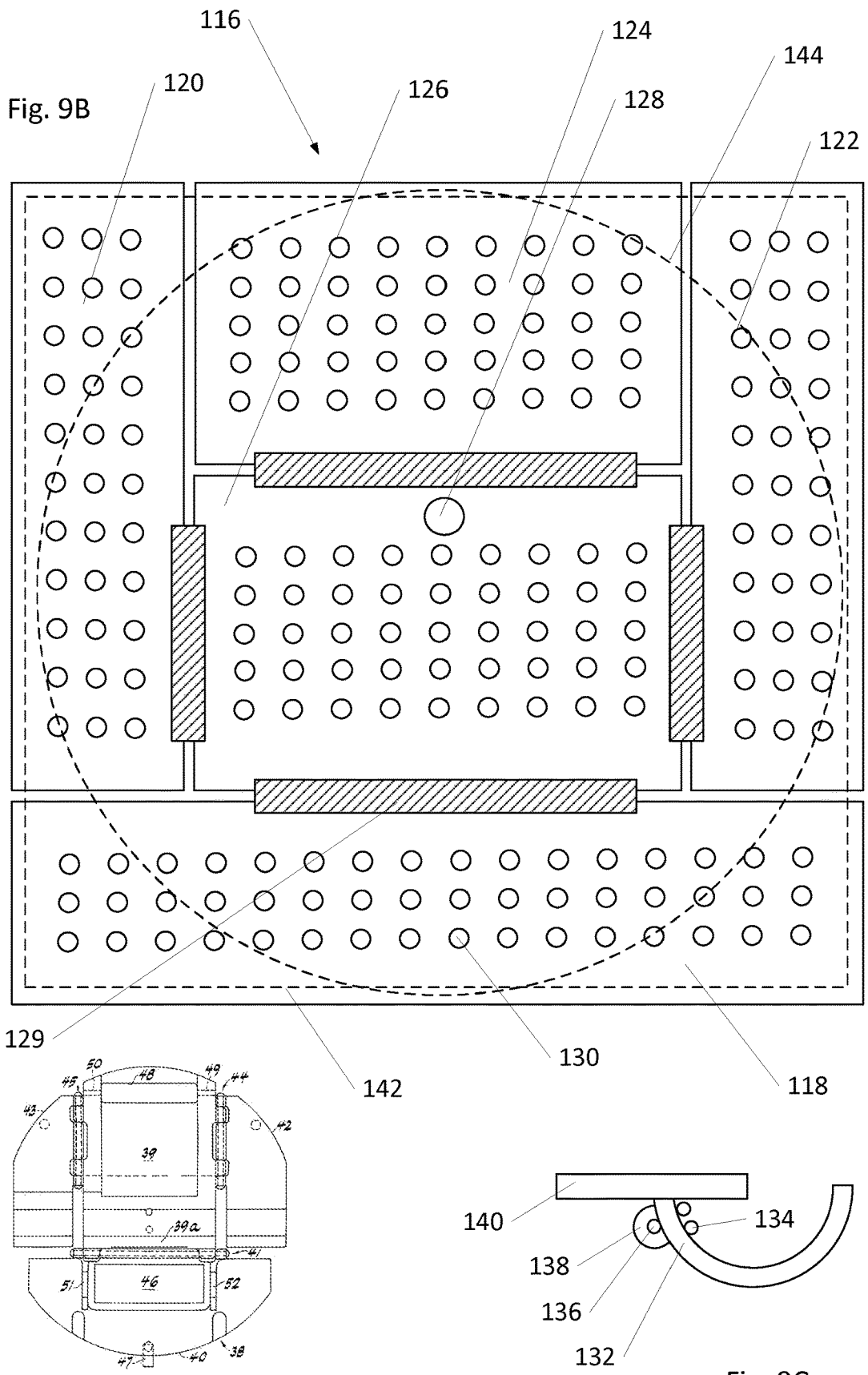
FIG. 9A depicts prior art.
FIGS. 9B-9C show apparatus for folding a food product.

FIG. 1 depicts in 3D view elements of a pouch 2 (the walls of which are not shown) comprising narrow fibers (e.g., nylon, Kevlar, stainless wires) 4L and 4R able to slice ingredients into smaller pieces, break up clumped ingredients, etc. The fibers are in some embodiments attached to left upper bar 6L and right upper bar 6R, and to left lower bar 8L and right lower bar 8R, or may be attached directly to the walls. If bars are employed, these are affixed to the inside surface of the pouch walls (e.g., left bars to left wall, right bars to right wall), and left fibers 4L are attached to left upper bar 6L and right fiber 4R are attached to left upper bar 6L. Fibers attached to the left and right bars are interleaved. Even-numbered fibers originate on left upper bar 6L and terminate on right lower bar 8R, while odd-numbered fibers originate on right upper bar 6R and terminate on left lower bar 8L. Between even and odd fibers is the ingredient to be processed (not shown). As the pouch walls are separated (e.g., by pulling on flaps per the 563 filing) during dispensing, even fibers are pulled right rightwards while odd fibers are pulled leftwards through the ingredients, slicing or breaking them up.

Ingredients such as tahini, nut butters, salad dressing, etc. may separate in storage. These can be re-mixed by inverting, shaking, and/or kneading the pouch before dispensing.

Laser cutting of ingredients may be used, and offers the benefits of applying no force (so a delicate ingredient such as a banana can be sliced without breakage or crushing due to a blade or clamping mechanism), and the ability to simultaneously cut while browning/searing surfaces if desired.

Wires/ribbons (e.g., metal), as well as waterjets, lasers, blades, and other devices can be used to cut ingredients while dispensing, to harvest produce growing with a kiosk, to cut portions of a dish (e.g., sandwiches) before serving, etc. Wires may be stationary, oscillated along their long axes (e.g., at subsonic, sonic, or ultrasonic frequencies). Cutting may be synchronized with motion of a receptacle below the pouch, thus allowing cut pieces to descend to specific locations within the receptacle. A wire or ribbon (plain or with disk-shaped blades at intervals) rotated relative to the pouch (e.g., around a vertical axis) may be used to spiralize an ingredient as it issues from the pouch.

A portion of a wire contaminated by ingredients may be cut off and disposed of. It may also be spooled, however, an insect able to enter the system, attracted to residues on the wire, may then be able to crawl to an unused portion of the wire and contaminate food, so creating a moat/barrier on the wire over which an insect cannot crawl may be useful; this can be a structure having a tacky or electrified surface which clamps over the wire, etc.

Ingredients may be heated, defrosted, cooked, cooled, or frozen while in-pouch or after dispensing by a variety of methods, including (as the case may be) microwave, RF, immersion baths, liquid-filled bladders, optical radiation (e.g., Brava, Newark, CA), pulsed electric field cooking or heating (IXL Netherlands, Schalkwijk, Netherlands). Bread and rolls may be cooked within an automated food system (e.g., while in a pouch). Ingredients already dispensed into a vessel may be heated, then a second group of ingredients dispensed and heated, if the first group of ingredients requires more heating than the second. A perforated pouch may be used to boil or steam ingredients (e.g., vegetables, pasta) by immersing the pouch into hot water, or introducing it to a steam source. Beverages and soups may be heated in the pouch and then dispensed into a cup or bowl.

Ingredients with flat surfaces (e.g., an egg patty, a tortilla) or which can be deformed to present flat surfaces (e.g., liquids, pastes, and liquid-solid mixtures) may be heated through the pouch fairly easily by simply pressing a heated plate again the pouch, passing one or more heated rollers along the pouch surface, use radiant heating, etc. But many ingredients do not lend themselves to this approach. In such cases, immersion of a pouch into a liquid (e.g., hot water) to change its temperature (as in traditional sous-vide cooking) is useful since liquid can completely surround the pouch contents and make close contact with them (through the thin pouch walls). However, the external pouch surfaces will become wet, and this is undesirable while dripping from the pouch onto food or machine components is problematic. In some embodiments pouches can be dried after immersion by air knives, absorbent towels, heat lamps, etc. Alternatively, FIG. 2 depicts an approach termed "Dry Conformal In-pouch Processing" (DCIP) which provides conformal heating (or cooling) but keeps the pouch dry. In FIG. 2A, two liquid-filled bladders 10A and 10B are depicted in elevation view, having a gap 12 between them for insertion of a pouch 14 (shown being inserted as indicated by arrow 15). Each bladder comprises a thermally conductive inner surface 16 that is preferably thin and elastomeric, such that it can conform to the shape of the pouch. In some embodiments, an inlet tube 18A and outlet tube 18B, allowing liquid (e.g., hot water) to circulate through the bladder, as shown by arrows 20. The water can be heated (or cooled) by an external heat exchanger system and kept at a constant temperature, or its temperature can be changed, very rapidly if desired. For example, the cook/chill and cook/freeze processes commonly used with ingredients within pouches can be implemented in a single machine and temperature dropped very rapidly (important for food safety): hot water in the bladders can be flushed out and cold water, or freezing propylene glycol/water introduced.

In some embodiments a single bladder may be used heating the pouch on one side, or wrapping around it (e.g., clamshell-shaped), and in some embodiments containers with only one flexible wall may be used in lieu of bladders. The bladders may be backed by rigid plates 22 as shown to allow pressure to be applied, or facilitate handling and motion of the pouch. In FIG. 2B, the system controller has lowered the pouch between the plates and has pushed the bladders against the pouch. The bladders conform to the pouch and transfer heat to or from it (bladders may also be used for cooling/chilling/freezing). When the pouch reaches the desired temperature, the controller separates the bladders and removes the pouch. In some embodiments in lieu of circulating liquid, the liquid in the bladder is static and the bladder may be closed. It nonetheless may be heated (or cooled), e.g., by a heater within the bladder, or a heater (e.g., a Kapton or silicone heating pad) on the outside surface of the bladder). In other embodiments the liquid is replaced by a soft gel, a mixture of liquid and solid particles (e.g., use of steel particles may allow for inductive heating), a phase-change material, etc.

Because the liquid in DCIP is not in contact with the pouch, there is no risk of contaminating it with a liquid that might otherwise be undesirable so close to food. Thus, is it possible to use a high boiling-point liquid in lieu of water as in sous-vide, and this can allow for faster heating/cooking, as well as for higher-temperature cooking (beyond what is possible with pressure cooking, for example). For example, using propylene glycol (b.p. 188° C.) or a propylene glycol/ water mixture might rapidly reheat food to serving temperature (typically ~71° C.). DCIP might also address the lack of browning in sous-vide since this requires the high-temperature Maillard reaction: since that reaction proceeds readily below 188° C., a steak pre-cooked sous-vide, for example, might not only be reheated by DCIP but a crust also formed before serving, while the steak remains inside the pouch (the pouch material of course needs to tolerate the high temperature). This is especially the case if the pouch allows for liquid produced during cooking to drain away from the steak surfaces. If the pouch contains ingredients and air, the ingredients can be made to move by agitating/tumbling the pouch which it is being heated in a DCIP apparatus. If the temperature is high enough and there's some fat/oil in the pouch, a form of stir frying may be achieved, with the pouch walls serving as a frying pan or wok. Sautéing or pan frying are also possible, as are other moist-heat, dry-heat, and combination cooking methods, and the cooking of pancakes.

Oil can be introduced in one of several ways: 1) already on the ingredients; 2 in the bottom of the pouch, adjacent to the ingredients; 3) forming a film on the inner pouch surfaces while in contact with the ingredient as-packaged; 4) forming a film on the inner surfaces, but mostly not in contact with the ingredient since the pouch walls are pleated like an accordion or bellows initially, and stretched apart only to allow cooking; 5) in a separate compartment within the pouch: allowed to enter the ingredient compartment by opening a temporary seal between the two. In this case, shaking and/or tumbling can be used to spread the oil within the pouch and coat the ingredients.

DCIP also overcomes other issues with sous-vide: 1) Assuming closed bladders and a closed fluid system in general, there is no loss of liquid to evaporation during heating, and so no need to add more liquid to compensate. 2) Whereas the air and hydrostatic pressure of the liquid in a pouch sealed under vacuum can press on the ingredients therein so as to help consolidate them (e.g., a granular ingredient) and provide for faster or more uniform heating, the amount of pressure is quite limited in most cases. In DCIP additional pressure is available by merely applying it to the bladders, which then transfer it to the pouch contents. Conversely, in the case of delicate ingredients or those that should not be compressed or they may stick together in a clump, the pressure on the pouch with DCIP can be kept lower than is common with vacuum packaged pouched. Moreover, vacuum is the best insulator, so having vacuum separate grains will not promote heating nearly as well as air, which can be used with DCI P. 3) Vacuum packaging also requires specialized equipment and/or pouches, has a long cycle time in manufacturing (e.g., a vacuum chamber must be pumped down, the pouch sealed, and then air re-introduced), and isn't suitable for packaging certain ingredients due to anaerobic bacteria. 4) With DCIP one can control where the liquid contacts the pouch and where it doesn't, by for example, using specially-shaped bladders, while with sous-vide the water totally surrounds the portion of pouch immersed in it (and steam also warms the portion above the waterline). Thus certain regions of the pouch (or certain compartments in a multi-compartment pouch) can be heated or cooled, with minimal disturbance to others, or a "window" with no liquid may be provided in which radiation (e.g., microwave radiation, IR) can access ingredients in part of the pouch (liquids with less absorption to radiation than water are also possible). Multiple bladders may also be used to process a single pouch, with bladders containing liquid at a temperature that may be different than the others. 5) While sous-vide cannot be used easily on a moving vehicle, and almost certainly not in a zero-gravity environment, DCIP can be, since the heat transfer liquid can be fully contained.

To heat grains and other granular/discontinuous ingredients with poor bulk thermal conductivity, the ingredients can be packed under vacuum, or packed in a liquid such as water which provides thermal contact, and which is drained from the pouch before the desired contents are dispensed. Compressing the ingredient (e.g., by applying force to the plates in FIGS. 2A-2B), or by generating gas within the liquid (e.g., by boiling it) can be used to reduce the gaps between granules and improve the efficiency of heating ingredients. Kneading, vibrating, tumbling, tilting, and inverting the pouch while heating can also help: such motions are difficult if not impossible with a pouch simply immersed in a liquid bath as in sous-vide.

The bladders are preferably well insulated to minimize heat loss (or gain), and may be kept in contact with one another when no pouch is being processes, reducing surface area. It may be desirable to use bladders with large volume capacity to increase thermal mass and minimize the required flow rate of liquid (if being flowed into and out of the bladders) or the duty cycle of a heater that heats the liquid in a closed bladder, though a small capacity would be preferable if rapid temperature changes are required.

The uniformity of liquid temperature within the bladder can be enhanced through mixing, and mixing can be achieved by deforming the bladder walls; tilting, shaking, or inverting the bladder; etc. If solid particles are incorporated into the liquid, they can assist with mixing, as can pressing an object (e.g., one with fins) against the exterior bladder walls. Even bringing two bladders together and separating them at intervals (e.g., when the pouch is not present) will aid with mixing. To help with mixing (and in some cases to help the bladders conform to the pouch) an air space may be provided at the top of each bladder.

With the pouch walls heated by very hot liquid in the bladder(s), a form of convective cooking in-pouch may also be achieved, in which air within the pouch can convect, as in an oven or air fryer. Thus, for example, a roll, bun, or other dough product might be baked (or if parbaked, finished off) inside a pouch. The pouch can be shaped (e.g., by thermoforming) so as to impact its shape to the roll.

DCIP-based heating, as well as other forms of heating such as microwave or RF, can be used to steam ingredients within a pouch, much like what can be done with Ziploc® Zip'n Steam™ bags (S. C. Johnson & Son, Inc., Racine, Wis.). IN some cases (e.g., with vegetables), a small amount water may be provided within the pouch. Ordinary steaming may also be done in which water is within a lower compartment of a pouch and an ingredient in an upper compartment, with holes separating the two that allow steam to move into the upper compartment. Water can be packaged in the lower compartment, or introduced while in the automated food preparation system. The water compartment alone may be placed again the bladder(s), allowing the ingredients in the upper compartment to be heated by steam alone.

In general, grains, pastas, etc. may be cooked in a pouch by introducing water into dry ingredients from a separate compartment, or from an external source, cooking the ingredient, and then draining the water. Boiling of grains, pastas, etc. (introduce water when needed into pouch or have two compartments with temporary seal). Similarly, ingredients such as dried fruit may be stewed, and dehydrated and freeze-dried ingredients rehydrated.

DCIP can be used with unpackaged ingredients as well. If the ingredients are solid and have sufficient mechanical strength, they may be placed in contact with the bladder walls, though to avoid mutual contamination, a single-use dividing film may be inserted between them. For ingredients that are liquids, pastes, liquid/solid mixtures, semi-solids, or otherwise have poor mechanical strength, then in some embodiments the bladder may be in the form of at least one horizontally-extending "pillow". The lower pillow (reminiscent of a waterbed) can have raised sides and a central depression to contain the ingredient, while the upper one (if used) can be configured to fit tightly against the lower one. Ingredients can then be placed directly into the lower depression and the upper pillow pushed down against them to heat (or cool) them from the top. If heating produces steam, the upper pillow can be raised slightly or at intervals to vent it.

FIGS. 3A-3F depict in elevation views a sequence in which a panini sandwich or other grilled sandwich may be grilled without direct contact with ingredients within an automated system. As shown in FIG. 3A, a sandwich 24 ready for grilling has been assembled by dispensing ingredients such as top and bottom bread slices 26A and 26B and a filling (e.g., cheese, vegetables) 28 from multiple pouches using a dispenser like that of the 563 filing, not shown. Alignment of one ingredient to another may be achieved using sensing (e.g., camera with machine vision, optical sensors) and movement of the bottom slice relative to the dispenser. Dispensing around blades 30A and 30B as in the 563 filing is assumed. A pouch 31 which had contained the final ingredient (e.g., bread) is depicted; the dispenser is not shown in FIGS. 3B-3E. All ingredients are dispensed onto a disposable heat-resistant protective film (e.g., parchment paper; aluminum, anodized aluminum, tin, copper, or stainless foil; glass-or-ceramic coated metal, thin glass or ceramic) 32 which is supplied by a roll 34 and which is pulled around a lower grill plate 36 and collected by a take-up roll 38. A film cutter 40, upper grill plate 42, and dish 44 are also shown. The upper plate is itself preferably covered by a protective film (not shown), which may be held in place by tension between pairs of rolls (as in FIG. 3G, but inverted), vacuum (e.g., if a cut sheet or only one roll is used), etc. Both plates are preferably ribbed/ridged and heated to grilling temperature.

In FIG. 3B, the system controller has moved the upper plate above the sandwich as illustrated by arrow 46. In some embodiments the lower plate 36 and associated elements have moved until under plate 42, while in other embodiments the lower plate is long enough to have part of it beneath the upper plate, and by advancing the film, the sandwich is conveyed under the plate. This also allows heating to be done other than under the dispenser, protecting it, and may allow another sandwich to be assembled simultaneously, etc. In FIG. 3C, the controller upper plate has been lowered onto the sandwich, as shown by arrow 48 applying pressure to it and compressing it. In FIG. 3D, grilling has been completed and the controller has raised the upper plate as shown by arrow 50 and lowered the cutter 40 as shown by arrow 52 to cut the film. In FIG. 3E, the controller has moved the upper plate to its original location (not shown) and has retracted the cutter as shown by arrow 54. The take-up roll has been rotated as shown by arrow 56 so as to pull the film as shown by arrows 58 and 60 around the lower plate, in the process transporting the grilled sandwich to the edge of the plate. Once sufficiently past the edge, the sandwich spontaneously tilts and starts to enter the dish below the plate, which is translated as shown by arrow 62 in the same direction as the sandwich. As the process continues (not shown), the sandwich completes its descent onto the dish and lies flat (the dish may then continue its motion toward a door or box where it can be accessed) and the film continues onto the take-up roll, unless cut from below (this is preferable to keep the take-up roll clean). FIG. 3F shows an alternative design for the lower plate in which a ramp at the leading edge 64 facilitates directing the sandwich into the dish and given the smaller radius, separating the sandwich from the film (it may tend to adhere to it; going around a small radius forces it to separate from the film). FIG. 3G shows an alternative design for the lower (or if inverted, upper) plate and rolls.

Difficulties feeding the film from the supply roll to the take-up roll may be addressed by incorporating heat-resistant drive rollers along the edges of the film; these can deliver the cut film leading edge to the take-up roller, where it can be grasped. In other embodiments the film is continuous and always covers the distance between supply and take-up rolls, but a portion (e.g., a square in the center) which contacts food can be removed and disposed of. For example, the section may be perforated and means provided to separate it from the continuous portion. The section may also be cut in place (e.g., by a rolling blade, drag knife, or laser) such that as the film advances (and preferably after discharging the sandwich), the section of film is cut out and falls into a waste bin below. As in FIGS. 31(*a*)-(*c*) of the 563 filing, the lower slice can be transported by the film (moved by the rolls) both for alignment and to help dispensed ingredients lie down flat and with the correct side (if it matters) upwards.

FIGS. 4A-4E depict in elevation views an alternative approach to making a panini, etc., in which the film plays a role in aligning the top slice to the bottom slice, at least along one axis, and sandwich cutting is provided. In FIG. 4A, the bottom slice 26B and filling ingredients 70 have been dispensed onto a piece of film 66, forming an open face sandwich above lower grill plate 36. Film 66 is supplied by a supply roll 72 and supported at one end by upper clamp 74A and lower clamp 74B (or by a take-up roll). An upper grill plate 42 is also provided. In FIG. 4B, the controller has dispensed the top slice 26A intentionally misaligned, shifted toward the clamps. In FIG. 4C, the controller has inverted and moved the clamps so as to wrap the sandwich with the film, simultaneously nudging top slice 26A into alignment with bottom slice 26B. In FIG. 4D, the controller has moved upper grill plate 42 over on top of the sandwich and applied pressure to it. The sandwich is then grilled by the heated plates, after which, in FIG. 4E, an ultrasonic blade 76 (e.g., Dukane, St. Charles, Ill., not shown in FIGS. 4A-4D) descends as shown by arrow 78 and slices through the sandwich cutting it in half (or another fraction) while surrounded by the film, thus keeping the blade clean (more than one cut may be made). Before or while the sandwich is sliced, roll 72 can release more film to avoid excessive tension and possibly tearing of the film, or preferably, clamps 74A and 74B move towards blade 76 or release film 66. In some embodiments blade 76 is provided with vacuum ports to tightly draw the film against it, hold the film in place, and/or avoid any gaps that may attenuate ultrasonic energy. Blade 40 cuts the film as shown by arrow 80. Before transferring the sandwich from the lower plate to a dish (not shown), the controller may impale the two halves with toothpicks (see FIGS. 21A-21E) to prevent them from falling apart while being transferred to a dish, etc. Transfer can be achieved by moving the clamps beneath the lower plate and pulling on the film; this can be more easily done if a take-up roller is used in lieu of clamps. In some embodiments the sandwich can be served inside or on the film. In some embodiments cutting is postponed until the sandwich has been transferred to a dish, obviating the use of toothpicks.

Packaging, Dispensing/Plating

For a delicate ingredient such as a banana, rather than pushing it out of the pouch during dispensing (or gradual slicing), the pouch can be peeled apart gradually as it descends, and by tensioning the pouch as in FIGS. 7(a)-(d) of the 074 filing, the ingredient would not fall out of the pouch. The grippers (e.g., 362 of the 074 filing) may be in the form of rollers with horizontal axes which allow the pouch to translate vertically but while can still provide tension.

Pouches can be provided with sealed regions which can unpeel or rupture due to the pressure of steam or other gasses produced during heating of the ingredient therein.

To better control location of an ingredient in a dish, especially if it is desired to place the ingredient near the edge of the dish, the ingredient should not overlap another ingredient, the dish is small, and/or to avoid the ingredient being deposited outside the dish, especially for ingredients that may disperse widely due to air resistance, the approach shown in FIGS. 5A-5B is useful. In the elevation views of FIGS. 5A-5B, the controller is dispensing an ingredient 81 from a pouch 82, e.g., as the pouch walls 84A and 84B are pulled around blades 30A and 30B, as in the 563 filing. Between the dispenser and a dish below is an angled deflector 86 which may be flat or curved and which overlaps the edge of the dish 88. The ingredient falls first upon the deflector, then tumbles/slides into the dish. The deflector is either itself single-use (e.g., thin PET supported by a frame) or is covered with a single-use film (e.g., retained by vacuum). To deposit in different regions of the dish, the dish center can be offset from the dispenser center, and the controller can rotate the dish below the dispenser and deflector, as shown by arrow 90 in FIG. 5A. In other embodiments, the dish and dispenser centers may be coincident, and the dish and/or the deflector rotates relative to the dispenser as shown by arrows 92 and 94, respectively, in FIG. 5B. If the ingredient tends to adhere to the deflector, then a moving film may be provided on the deflector surface which can serve as a conveyor belt to transport the ingredient to the deflector edge, at which point it will detach and fall into the dish.

In the elevation views of FIGS. 6A-6B, in lieu of a deflector a funnel 96 is provided; this can similarly comprise a single-use material. The dish and funnel then translate (or rotate) relative to the dispenser, allowing different portions of the funnel to guide different ingredients into different locations within the dish. In FIG. 6A, ingredient 81 is dispensed into a left location in dish 88, while in FIG. 6B, ingredient 98 is dispensed in a right location.

Slices of an ingredient (e.g., kiwi, banana, etc.) which are to overlap in a dish (e.g., for aesthetics) can be vacuum packed in a single column, end to end, or can be packed already overlapping, and then dispensed (e.g., using the tilted pouch conveyor method of FIG. 51 of the 563 filing).

Machine vision can be used to identify ingredients in the wrong position, and a grasper, preferably single-use or covered with a single-use material, may be used to remove or relocate them.

While for many Type 2A ingredients (defined in the 563 filing), the pouch would be peeled open to the full width of the chevron, for some ingredients (e.g., small ones like chia seeds) it may be peeled to a smaller width to control flow.

Some ingredients (e.g., hummus) may attach to the inner walls of the pouch rather than drip/ooze/fall out. To avoid this, other than using use a pouch with a built-in tube (costing more to manufacture), the angle of the pouch walls between the peeling front 102 and the blades can be increased, as in the elevation view of FIG. 7. In FIG. 7, the controller has pushed pouch 100 having 84A and 84B, (or it has been allowed to drop of its own weight) so that the peeling front—normally higher than the blades—is lower, thus increasing the angle 104 to over 180 degrees. The ingredient 105 issuing from pouch interior 106 at the peeling front can thus not easily attach to the wall in locations such as 108. In FIGS. 8A-8B, the portions of the pouch walls below peeling front 102 are pushed closer together by a rotation of the blades shown by arrows 112A and 112B (or the introduction of supplementary blades) as in FIG. 8B, thus causing those portions to form a spout. The angle 114 between the exterior surfaces is large, thus again minimizing the risk an ingredient will attach to the pouch film.

Blades 110A and 110B, as shown in FIGS. 8A-8B, while normally used to redirect the left and right pouch walls 84A and 84B and encourage detachment of adherent ingredients, can also in some embodiments be rotated from their normal orientations as shown in FIG. 8B. Rotating the blades can have other uses:

1) It can help to break up ingredients which tend to clump, such as cooked rice or raisins. Slicing the ingredient can be achieved if forces are adequate 2) It can clamp the two pouch sides together, serving as a valve that stops the ingredient from flowing outwards (whether type 1, 2A, or 2B). This can be useful to a) controllably limit the amount of the ingredient dispensed (e.g., by sensing weight loss or weight gain of the dish); b) to temporarily stop flow while the dish is being repositioned (e.g., for imaging, or to allow the ingredient to be dispensed in a different region of the dish); c) to prevent dripping onto the dish while the dish moves out of the way to expose the waste bin below into which the pouch will be dropped; or d) control the rate at which the ingredient is dispensed (e.g., light or partial clamping).

3) Two pairs of moveable blades, one above the other, can be used in an "airlock" mode to release an ingredient with more control: with the lower pair closed, the upper one can open, filling the pouch between the pairs. Then, the upper pair closes and the lower pair opens, dumping that portion of the ingredient.

In some embodiments one can use an air jet to deflect an ingredient which has partially exited the pouch so that it tilts in a way that ensures it will fall into a vessel with a particular side up (e.g., the cut side of a strawberry). This is an alternative to having the ingredient contact a moving dish, and is particularly useful for smaller ingredients which cannot contact the dish (or an ingredient already in the dish) while a portion is still within the dispenser as in FIGS. 31(a)-(c) of the 563 filing.

Regions of the peelable seal of the pouch can be made to require much more force to peel to peel than other regions, thus serving as a peeling stop (or alternatively, can be made easier to peel, thus allowing for venting). For example, in the apex region of the seal, a maximum width for the opening can be set based on the specific ingredient within the pouch (e.g., in consideration of its viscosity). Or, the region where the chevron transitions into the sides of the pouch can be reinforced to prevent over-peeling when applying tension to the flaps to provide stability for a protruding tube, prevent spontaneous widening when dispensing under higher pressure (for type 1), etc. Location-specific seal reinforcement can be achieved by using a sealing die with a spatially-varying temperature, a die with a variable width (wider taking longer to peel), varying the sealing time (e.g., sealing twice, with the second seal only affecting certain regions; this second seal may involve a small, CNC-positioned die), using a two-piece die (e.g., one portion engages the pouch for longer than the other, etc. Some of these methods can be customized to a specific ingredient without modifying the die that forms the pouch seal. In some embodiments the seal is locally made stronger, but not so strong that it can't be peeled with additional force applied. For example, it might be desirable to open the pouch fully to allow any residues to fall out into a dish or a waste bin even if initially a more controlled approach is desired.

An automated system may be used to serve food that involves folding/wrapping one or more ingredients in another, such as a burrito or spring roll. For mass production of such items, machinery which provides for three of the four folds normally required has been described (FIG. 9A, from U.S. Pat. No. 5,912,035 (Grat)). Such machinery depends on moving platforms with hinged flaps, the plates being moved by 3D cams as the platforms move. To produce one burrito (for example) at a time, however, a folding platform which does not need to be moved, and which can perform the fourth fold and wrap the burrito, all without human intervention, is needed. Moreover, the process should be carried out without direct contact between ingredients and apparatus.

FIG. 9B depicts in plan view a platform 116 comprising four moveable flaps 118, 120, 122, and 124 and a fixed center plate 126 provided with a retractable pin 128. The flaps and plate are provided with vacuum holes 130, which allow a piece of foil used to wrap the burrito after folding to be retained onto the flap and plate surfaces, preventing contact with ingredients. The flaps may be hinged to the plate (hinges 129 are shown) as in the prior art as shown, in which case they may be rotated by suitable actuators such as rotary or linear electric or fluidic actuators, through linkages as required, etc. The elevation view of FIG. 9C depicts an approach to actuating flaps using a curved rack 132 (teeth not shown, though frictional approaches are possible) that is captured between idler wheels 134 and a pinion 136. As the pinion is turned by motor 138, the rack is moved through an arc, rotating the flap 140 (representing any of flaps 118-124). At least two racks and associated hardware may be used per flap. Such an arrangement does not necessarily require that the flaps are hinged as in FIG. 8B, but if hinged, then the idler wheels may be eliminated.

The steps in making a burrito and wrapping it in foil are in some embodiments as follows: 1) Place foil onto the platform as shown by outline 142 and turn on vacuum to retain the foil against the surface of the plate and flaps; 2) place tortilla onto foil as shown by outline 144; 3) dispense ingredients onto tortilla; 4) rotate flap 1 to form fold 1; 5) rotate flap 2 to form fold 2; 6) rotate flap 3 to form fold 3; 7) rotate flap 4 to form fold 4; 8) turn off vacuum to all flaps and optionally, to plate; 9) repeat steps 4-7, this time causing the foil to be folded and wrapped around the burrito; 10) transfer the burrito to a serving dish by raising pin to cause burrito to roll off platform into a serving dish (alternatively, tilt platform).

The 2-part dispenser of FIGS. 40(a)-(b) of the 563 filing can facilitate cleaning if needed, and also can avoid the need for a retractable squeegee/roller if for Type 1 ingredients only. If intended for any Type (universal dispenser), a retractable squeegee/roller can also be avoided by spacing the two halves further apart for Type 2A/2B ingredients (which will produce a shallower angle between the flaps en route to the blades) and bring them closer for Type 1 ingredients Ingredients which are lightweight and/or have high surface area can disperse too widely when dispensing, ending up in the wrong area of the dish, or outside the dish. Bringing the dish closer to the dispenser can help, as well as surrounding the region below the dispenser with inwards-directed fans, or reducing the air pressure within the dispensing area (under vacuum, all ingredients fall straight down).

The geometry of pouches can be customized after being made with a standard die using a CNC-controlled hot sealing tip, a laser, etc., so as to a) generate multiple internal volumes; b) control ingredient migration (this can be done after loading pouch (e.g., while pouch is horizontal) and can utilize machine vision (recognizing the contours of each piece of the ingredient) to create obstacles (allowing ingredients to be dispensed like Pachinko balls when the pouch is agitated) or small compartments; c) make regions of the chevron much harder to peel as described already.

When dispensing an ingredient B after dispensing ingredient B that is hot, rising steam may condense on the pouch inner surfaces and make the ingredient B cling to the pouch walls. Passing them around the blade (even for a Type 2A ingredient) can help, as can heating the walls (e.g., via a hot air knife) and/or blades.

In some embodiments, 'adaptive dispensing' is desirable, in which the system controller adjusts the location, dispense rate, volume, or other parameters (including which ingredient to dispense among several choices) based on the location, shape, volume, weight, texture, etc. of ingredients already dispensed into a vessel. 3D imaging can be used, though in some cases 2D imaging or other sensing methods are adequate. For example, to determine location and orientation (e.g., of a dispensed bread slice) only, 2D imaging may be suitable.

Some ingredients (e.g., tortillas which are flexible) may be folded, rolled, or otherwise compacted in order to fit within a pouch; once dispensed, vibration of the dish, etc. may be used to unfold/unroll/spread them if desired.

Vibrating and/or tilting the vessel receiving an ingredient may be used during or after dispensing to distribute the ingredient within, avoid too high a mound/pile, etc.

Specialized pouches may be provided with such features as a) absorbent linings on one or both inner surfaces; and/or b) shallow depressions or projections on one or both inner surfaces (e.g., using thermoforming) that stabilize ingredient position, control dispensing, etc.

Pouches can be vibrated/jerked while en route to the dispenser so that contents move to the bottom: this can be done using the Z axis of the pouch grasper or a separate mechanism.

The dispensing sequence can be designed so delicate ingredients are dispensed after other ingredients which can form a cushion (e.g., liquids, pastes, and gels, leafy vegetables (e.g., lettuce, kale), etc.) are already in the vessel, thus avoiding damage to the delicate ingredients.

If ingredients adhere sufficiently to the inner walls due to moisture, stickiness, etc., then they may remain in place sufficiently without needing a sleeve (e.g., that of FIGS. 32(a)-(h) in the 563 filing) to constrain them, e.g., after a vacuum-sealed pouch is unsealed (prior to unsealing, the pouch walls would prevent movement).

In addition to peeling to open a pouch, pouches can be opened by tearing along a score line (e.g., laser-produced) or tearing against the edge of an external fixture preferably clamping the pouch.

Instead of squeezing out Type 1 ingredients using sliding/rolling element such as a squeegee or roller, ingredients may be expressed from a pouch by inflating a pillow or bladder adjacent to the pouch on one or both sides, or pressing a compliant object against the sides. If an inflatable pillow is used, preferably it inflates first at the top and the level of inflation then descends, thus avoiding possibly trapping part of the ingredient within the pouch. The pillow stiffness (e.g., controlled by local thickness) can be designed so the pillow is stiffer in its lower regions than in its upper ones. Then, the pillow will first expand toward the top, and by gradually increasing inflation pressure, it will inflate further and further toward the bottom. Ingredients can also be expressed by surrounding them with a pressurized chamber.

A downdraft or horizontal air flow can be used at least momentarily to prevent steam rising from the contents of a vessel from moistening a spice dispenser and creating dispensing problems, mold, etc. (the dispenser can, when not being used, be closed off by a well-sealed door)) or from reaching a dry ingredient being dispensed from a pouch (it may not dispense as easily if it becomes moist).

Type 2A ingredients can include low viscosity flowable liquids (e.g., water, milk, some oils) that barely (if at all) adhere to the pouch walls and simply fall out of the pouch.

An ingredient such as banana, tomato, pickle, cheese, pepperoni, etc. can be pre-sliced but allowed to remain together in the pouch. This can require considerably less volume than packaging each slice pre-separated, and also reduces surface area, enhancing freshness. Slices can be retained by tensioning the pouch with rollers above the lowest slice and lowering the pouch gradually so that the tensioned region will moves upwards. Since slices can adhere to one another, especially for a moist ingredient, they may be dislodged by using an air jet, a moving wire, shock, vibration, etc. Or in some embodiments as shown in the elevation view of FIG. 10, slices 146 can be packaged pre-separated from one another by a continuous separator 148 preferably made from the same material as pouch walls 149 for recyclability (or non-adherent wax, parchment paper, etc.) which zig-zags back and forth. The top end of the separator is anchored to the pouch at or near the top seal 150 so it can't fall into the dish while the lower end may be free. The separator can be coated with an oxidation inhibitor, moisture absorber, anti-microbial/fungal chemical, etc.

The interior compartment of a pouch can be considerably narrower than the exterior (the width of which may be standardized). Doing so can be used to prevent ingredients (e.g., slices of salami) from "hopping" one over the other, especially (if the pouch is under vacuum) once the pouch is unsealed. As shown in the elevation view of FIG. 11A, multiple internal compartments 152 may be provided. If all are peeled open simultaneously by pulling on flaps 154 as would be the case in FIG. 11A, then multiple "streams" of an ingredient 156 can be simultaneously dispensed, with or without a significant spatial or temporal separation between them. Or, in the case of FIG. 11B, the compartments can be separated along a separation line 158 (e.g., scored, perforated for tearing, or cut), allowing one compartment at a time to be unsealed. For a Type 1 ingredient, a narrower squeegee/roller or an inflated pillow, etc. may be used to expel the ingredient.

FIG. 11C depicts a pouch in which the internal compartment 160 is not vertical but is instead, a zigzag (or in the simplest form, merely diagonal). Such a compartment has more capacity than a vertical compartment of the same width. If the ingredients are not particularly sticky, they can simply slide or roll down one after the other once the pouch is opened. But if peeling of the pouch is required to release them, then the pouch can be peeled gradually, releasing each piece of ingredient one at a time. If it matters where the ingredient lands in the vessel below, the vessel can be moved relative to the pouch to take into account that each piece will exit the pouch in a different location.

Ingredient Storage and Kiosk Restocking

Ingredient pouches can be loaded into secondary packaging such as a reusable "smart module", allowing them to be safely and efficiently transported from a food production facility such as a commissary to a kiosk, de-skilling and speeding restocking, and allowing ingredients which are near expiration or not selling to be removed from the kiosk and transported elsewhere. Such modules can be designed to a) maintain pouches at a food-safe temperature (e.g., below 40 degrees or above 140 degrees F.) and log the temperature history of the module; b) protect the pouches from mechanical damage; c) allow rapid insertion into and removal from the kiosk; d) transmit their whereabouts; e) communicate their contents, where they came from and where they're going; f) make tampering difficult; g) detect any tampering. They can be equipped with a GPS receiver, a cellular network radio, Wi-Fi transceiver, a microcontroller with memory (e.g., for logging history and status), sensors (e.g., for vibration, shock, temperature, light, pressure, moisture, gas), etc. Modules can be in the form of reusable, tightly-sealed, weather- and waterproof boxes with insulating material and/or phase-change material in the walls that help maintain the desired internal temperature, and can be provided with hatches or doors (e.g., hinged, sliding, folding, roll-up) to provide access for loading and unloading.

Figure 12A:
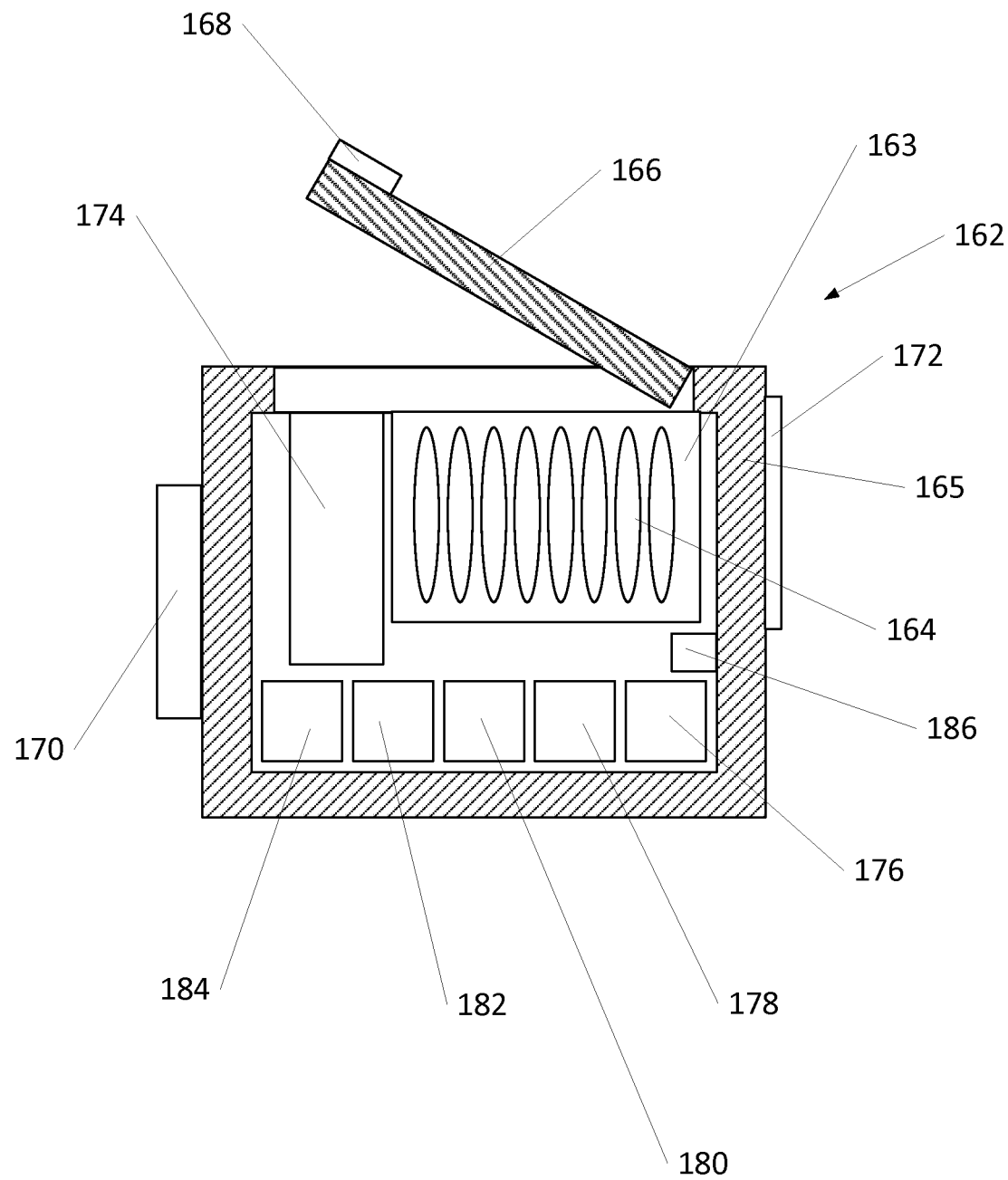

FIG. 12A shows a cross-sectional elevation schematic of a smart module 162 loaded with ingredient pouches such as pouch 164 (ingredients in other forms of packaging could also be accommodated) within a compartment 163. The module may comprise the following subsystems the location of which can vary from FIG. 12A: an thermally-insulated enclosure 165, an access hatch 166 lockable with lock 168, an interface to the automated food kiosk 170, a display 172, a waste receptacle 174 to receive, for example, empty or expired pouches from the kiosk (the receptable may have multiple compartments allowing segregation of waste (e.g., two different films of which the pouch is fabricated)), a power source 176, a wireless system 178, a GPS receiver 180, a sensor package 182, a data logging and control subsystem 184, and an identification unit 186, the latter potentially using RFID technology. It may also include (not shown) a source of energy needed for operation of the kiosk (e.g., if not connected to the electrical grid) such as a battery, fuel for a generator or fuel cell, etc. The source or the energy it contains can be transferred to the kiosk while the module is docked within it or to it (e.g., a battery in the kiosk can be recharged by a battery in the module), or the kiosk may function primarily by drawing power directly from the docked module.

Modules can be provided with a unique ID code (e.g., via RFID, EEPROM) and have additional data storage that can be written to record current contents (e.g., ID codes of all pouches), location history, temperature history, etc. they may include a display (e.g., E Ink, E Ink Corporation, Billerica, Mass.) indicating status, serial number, next destination, last location, tamper status, internal temperature, contents.

Though the outside surfaces of sealed pouches normally do not come into contact with ingredients, if desired, they can be sterilized prior to or while loading the module with pouches (the internal surfaces of which can be made sterile before ingredients are loaded). Sterilization can involve ultraviolet light, pulsed light (e.g. Claranor, Avignon, France), gamma radiation, electron beam, ethylene oxide, or other methods. Compartment 163 should of course also be sterilized before loading pouches in this case. Once the module is loaded and locked, there will be no human contact with the pouches prior to the ingredients being dispensed and served. This reduces the risk of pathogens due to handling.

Compartment 163 can contain or be in the form of cubbies (e.g., horizontal, angled) into which pouches are placed, isolated from one another, though in some embodiments multiple pouches may be within a single cubby. Preferably the materials of construction of the module are lightweight but strong and not easily breached, and the doors are locked and not easily opened except by authorized personnel (or within the kiosk, automatically), making them nearly tamperproof. However, they can also include sensing means such as sensor package 182, that detects (and transmits and/or records) unauthorized opening or tampering (e.g., while en route between commissary and kiosk). For example, an attempt to open the doors or break through the walls can be detected via vibration and shock sensors, light sensors, pressure sensors (if the internal pressure differs from atmospheric pressure when sealed), gas sensors (if the internal atmosphere is different from ambient), light sensors (to detect the intrusion of light), etc. Moreover, temperature sensors can be used to detect inadvertent or intentional overheating or over-cooling, with the data logged by subsystem 184. GPS and a wireless system can be used to identify the location of the module at any time, which allows the restocking time to be predictable, module replacement coordinated with activities of the destination kiosk, and detect issues while transporting the module. Sensor readings may also be transmitted by the module continuously or when queried remotely, allowing identification of modules whose contents have become overheated or tampered with, for example, enabling a replacement module to be dispatched.

The kiosk can include one or more bays to receive the module or the module can remain outside the kiosk but dock with it. When an attempt is made to insert or attach a module, the kiosk can verify (by reading programmable memory on the device, by consulting a remote database, etc.) that the module is a) the correct one to be loaded into the machine at the current time; b) hasn't been tampered with or abused, c) has followed a route to the kiosk that is reasonable, d) doesn't contain any ingredients that have expired, etc. In addition to detecting problems using the module's built-in sensors, the kiosk bay can be provided with visual sensors that examine the module's exterior (e.g., looking for damage or breaches), strain gauges that weigh the module (so that its weight upon leaving the commissary matches the current weight), etc. To verify the route, it is not necessary that the module be equipped with a wireless system and transmit GPS coordinates during transport. Rather, it can log the route, and before the kiosk accepts the module, it can read the route data and validate that the route and timing of movement along the route are reasonable and not indicative of deception or potential spoilage.

The kiosk can determine the gas pressure inside the module without opening it by measuring the position or shape or stiffness of a diaphragm exposed through a wall of the module, or one that's hidden within but which can be measured by an external sensor (e.g., inductive, ultrasonic). An internal pressure sensor that communicates pressure wirelessly (e.g., using near-field communications) can also be used.

The module generally would be locked and unopenable during transit (e.g., by the restocking driver transporting it), but if authenticated and validated by the kiosk, it can then be accepted into the kiosk (e.g., with the bay doors closing it in) and then opened within it. The driver may also be authenticated, such as through a smartphone app using biometrics, before the module is accepted. Additionally, the module can be opened at the commissary, for example, using a special code that is input to a keypad or touchscreen, using near-field communication, etc.

In a first embodiment variation, modules are each dedicated to one particular ingredient or related group of ingredients, much like an inkjet cartridge contains a single color of ink. This has the benefit of not removing ingredient A from the machine if it can be used, in order to restock with more of ingredient B sharing the same module. However, such an approach is not without issues. If the module capacity is too small, then module cost per pouch is too high, handling is cumbersome, surface/area volume increases (making thermal management more difficult), and the ratio between internal and external volume decreases. If it is too large, it creates inventory management issues. For example, if it is believed that twenty more pouches of a given ingredient will be needed before the next restocking visit to the kiosk, but the module only contains fifteen, then the only two choices are 1) leaving the current module in place (possibly resulting in selling fewer meals) or 2) replacing it with a module having more pouches, in which case the current module has to be unpacked (e.g., at the commissary) and allocated to another module or supplemented with additional pouches. The latter may be a logistical burden. Furthermore, some ingredients are needed in greater volume than others, making it inefficient if all must use the same size module (yet having multiple sizes can be cumbersome). Finally, if the machine requires many different ingredients, then many different modules must be accommodated.

Thus, in a second embodiment variation, the modules serve essentially as multi-ingredient "suitcases" or "shopping bags" only, i.e., they are used to transport pouches from commissary to kiosk (or back again). The module may be packed at the commissary according to (remotely-monitored) kiosk inventory and usage patterns, and by applying a predictive algorithm. Once inserted into a kiosk, the pouches are unpacked and transferred to internal storage subsystem (analogous to a pantry) and the modules are thus emptied at least in part. They may be loaded by the kiosk with pouches which are close to expiration or not selling, ready to be removed at the next visit. In this variation, the kiosk preferably has enough internal volume to accommodate both its internal storage and inserted, unpacked modules (the needed volume can be reduced if the modules can be nested or are collapsible). In this variation, modules are never removed that contain pouches that are usable, obviating the logistical problem noted above. In this variation, there can be in principle only one module (though handling of this can be difficult in some circumstances).

In a third embodiment variation, there are multiple modules per machine, and the modules are not unpacked (with the pouches transferred to internal storage upon insertion into the kiosk) as with the second variation. Nor is each module dedicated to a single ingredient or group of ingredients as in the first variation. Rather, pouches are drawn from each module as needed, but in a way that tends to keep certain modules fuller and certain modules emptier. Moreover, modules can be "defragged" regularly (to use a hard disk metaphor)—with the kiosk moving pouches from module to module (e.g., during machine idle times)—so that by the time of the next restocking visit, at least one module has been emptied of usable pouches (it may contain pouches ready to expire, or pouches destined for another kiosk). Then, at the restocking visit, it is merely a matter of quickly removing such a module and swapping in a module with usable ingredients (e.g., full of such ingredients). Thus, according to the third variation, shortcomings of the first and second variations may be addressed.

Figure 12B:
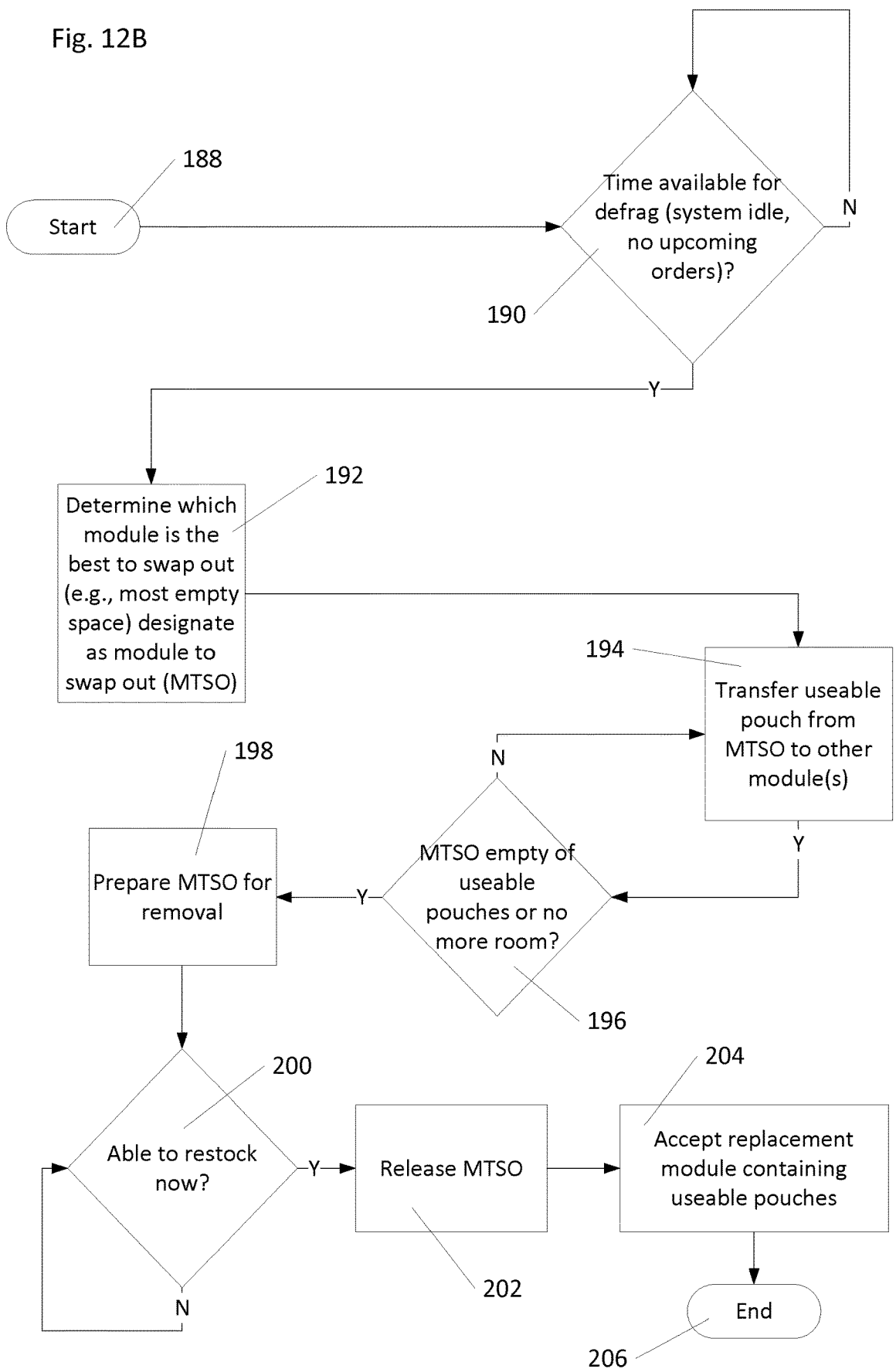
FIG. 12B depicts a flowchart relating to the module.

FIG. 12B depicts a flowchart for defragging the modules. Before a restocking visit if not earlier, the kiosk can be defragged such that as many modules as possible are ready for removal, while useable pouches are consolidated in the remaining modules. In the figure, the defragging process starts at 188. The automated food system controller then proceeds to determining in 190—assuming the machine shares resources (such as a pouch manipulator) needed to defrag with those needed to serve a customer—whether there's time available for defragging (e.g., no anticipated orders). In 192, the controller determines which module should be swapped out first, designating that module MTSO (module to swap out). This determination can take into account which has the most empty space, which has ingredients that are nearing expiration, which has ingredients that aren't expected to be needed near-term, etc. In 194, the controller transfers a useable pouch in the MTSO to another module; this process continues based on the decision node 196, until there are no such pouches left, or there is no room for useable pouches in other modules. In 198, the controller performs any additional preparation for removing the MTSO, and in 200, the controller waits until an opportunity for restocking becomes available (e.g., a module is delivered to the automated food kiosk). In 202, the MTSO is released by the controller and removed from the kiosk and in 204, a replacement module with useable pouches is accepted in its place. Finally, in 206, the restocking process ends. In practice, several modules may be swapped out at a single restocking opportunity.

Pouches in a module that is removed in some cases are not unuseable. Rather, they are needed or are expected to be needed by another kiosk, and the expectation is that the "donor" kiosk doesn't need them. In this case, modules are removed from one kiosk and installed in another.

Modules can include their own cooling (or heating) system (e.g., thermoelectric cooling), or have a port that interfaces to a duct that introduces air from one or more cooling (or heating) systems built into the kiosk. The kiosk may have central HVAC, in which case air flow to each module can be adjusted to optimized its temperature, or may have individual HVAC units for each module. Modules cubbies can be defined by meshes or grills which allow air circulation within.

Modules may be designed to be small and lightweight enough (e.g., 25 lb.) and equipped with handles so they can be carried easily, including loading and loading from a car trunk or back seat. Since a kiosk may need multiple modules to be exchanged during a restocking visit, a cart can be used to facilitate moving modules between a restocking vehicle and the kiosk. The cart can have wheels or casters at the bottom and a handle for pushing or pulling. Multiple modules can be stacked on the cart, and can be interlocked temporarily so they remain stable if the cart rides over uneven terrain, etc. Preferably the cart has two sides: the first, empty side can interface with one or more modules to extract them from the kiosk, while the second, full side can load modules into the kiosk. A restocking technician would first approach the kiosk with the empty side, then withdraw the cart, rotate it 180 degrees, and then insert the full side into the kiosk. Preferably the kiosk, cart, and modules are designed so that the cart can roll under a portion of the kiosk and while in position a) modules to be removed can be automatically unlatched from the kiosk such that when the cart is withdrawn, modules to be removed are already on it; and b) modules to be loaded can be automatically latched by the kiosk such that when the cart is withdrawn, modules to be loaded have been removed. In some embodiments the cart is autonomous and can travel to and from the restocking vehicle (or even the commissary) on its own. If the modules do not contain a compartment with waste (e.g., empty pouches) to be removed from the kiosk and the kiosk has a separate waste bin, then the cart can also remove the bin from the kiosk and replace it with a fresh bin.

In some embodiments to extend the shelf life of ingredients, the modules or the space the modules occupy within the kiosk can incorporate electric field-based preservation technology known to the art. For example, SandenVendo America, Inc. is introducing Kuraban (https://www.vendo-co.com/copy-of-g-snack-combos), a non-thermal electric field energy technology which can extend shelf life dramatically, and work done at the University of Auckland (https://www.researchgate.net/publication/37985111_An_Investigation_on_the_Non_Thermal_Pasteurisation_Using_Pulsed_Electric_Fields), and other research such that of Jun Innovations (Honolulu, Hi.) (Jin Hong Mok et al.

"Effects of pulsed electric field (PEF) and oscillating magnetic field (OMF) combination technology on the extension of supercooling for chicken breasts") describes similar benefits. Electric fields may also be used to accelerate plant growth, and can be helpful for hydroponic/aeroponic growing of produce within a kiosk.

The elevation views of FIGS. 13A-C depict an autonomous restocking sequence wherein a wheeled vehicle docks with a kiosk. Docking and module exchange can be governed by the kiosk controller and vehicle control communicating and orchestrating events cooperatively. In FIG. 13A, restocking vehicle 208 approaches, as shown by arrow 209, docking interface 210 of kiosk 212 containing module 214 to be removed with the empty, receiving portion of the vehicle at the front and a module 216 to be inserted in the kiosk (e.g., full of fresh pouches) at the back. In FIG. 13B, it has docked with the kiosk and module 214 is being transferred as shown by arrow 213 to the vehicle. In FIG. 13C, the vehicle has undocked, turned itself around by 180 degrees, and is in the process of redocking as shown by arrow 215 with the kiosk, after which module 216 will be inserted into the kiosk, followed by the vehicle undocking and travelling to the commissary, truck, another kiosk, etc.

The elevation views of FIGS. 14A-14C depict an autonomous restocking sequence wherein flying vehicle (e.g., drone) 218 docks with kiosk 220. Docking and module exchange can be governed by the kiosk controller and vehicle control communicating and orchestrating events cooperatively. In FIG. 14A, the kiosk is presumed to have room for module 222 (e.g., a module that is empty or containing expired pouches has already been removed, or there is room for an additional module) and the vehicle carrying a fresh module to which it is coupled by coupler 223 is moving in the direction of arrow 224 to dock with the kiosk's docking interface 226. In FIG. 14B, the vehicle has docked, while in FIG. 14C, the vehicle has undocked and is departing in the direct of arrow 228 leaving behind the newly-delivered module. Appropriate protection against intrusion into the module by water, snow, etc. may be provided (e.g., the vehicle may enter horizontally while under a canopy that covers the kiosk receiving bay. A single aerial vehicle can remove a module from a kiosk, flip over (reversing its thrusters) and then deliver a module that had been above it but is now below it, etc.

Figure 15:
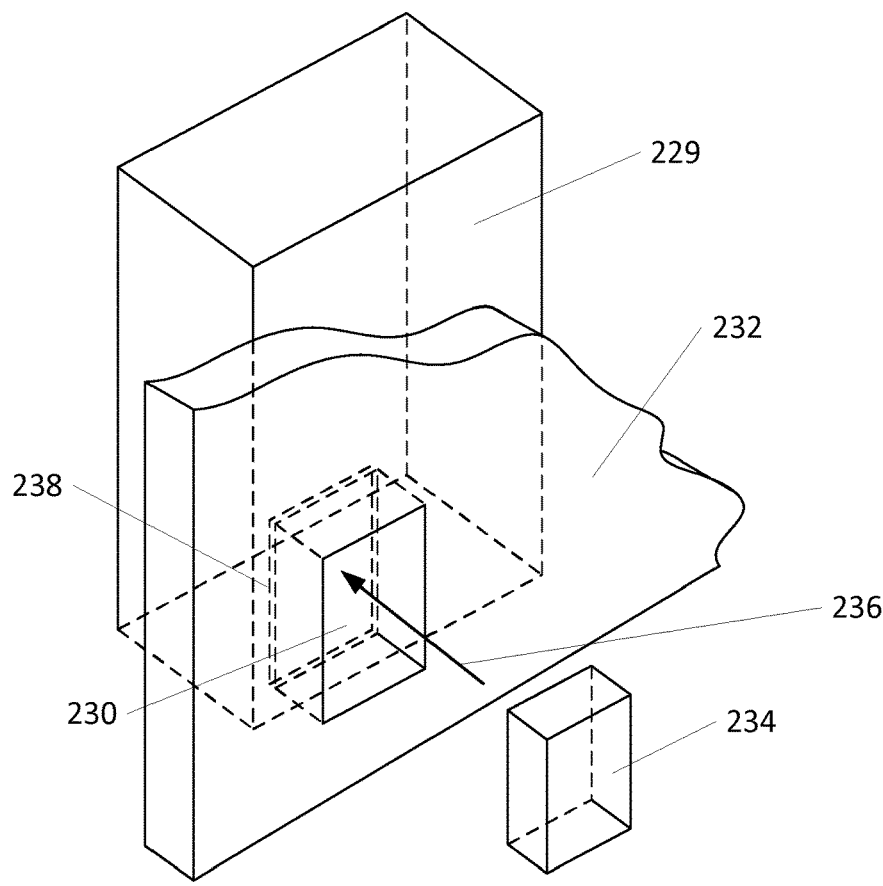

FIG. 15 depicts an approach for restocking kiosk 229 through a wall (e.g., an exterior wall against which the kiosk is installed). An aperture or pass-through 230 in the wall 232 (e.g., normally closed by an electronically-locked door) can open, allowing entry of an authorized, identified module 234, as well as removal of a module previously in the kiosk, through the aperture, in the direction shown by arrow 236. The aperture can be created to be aligned with a module bay 238 accessed on one surface (e.g., the rear) of the kiosk. Once inside the kiosk, the module may be translated and/or rotated as needed. Modules may be loaded in this way by autonomous vehicles (e.g., those of FIGS. 13A-13C or 14A-14C) from outside a building.

Pouch Grasping

The pouch grasper shown in FIG. 19(d) of the 563 filing has jaws which span the space between the fingers 276. However, in some embodiments there are four narrower jaws with space between each pair, rather than two wide jaws. This can be helpful in eliminating a possible collision between the center region of the top edge of the pouch, which can significantly non-planar when the pouch is at least partially full, since such a collision can displace the pouch from its preferred position and make it harder to consistently grasp in the same position and orientation, which is undesirable since variations in pouch grasp can affect performance of the dispenser.

The grasper may be designed to be alignable to the pouch along the length of the top seal, such that the pouch can be grasped on center, and so that its top edge is sufficiently parallel with the grasper. For example, the grasper may be provided with a rotary axis (rotating about the vertical/Z axis, or an approximately vertical axis), allowing the jaws to be oriented parallel to the top edge of the pouch. Or, at least one of the jaw pairs can be provided with actuation allowing it move toward or away from the pouch before grasping: this allows the insertion distance of the top seal into the two pairs of jaws to be matched, ensuring parallelism. The depth of insertion into the jaws can be sensed and be made repeatable using suitable sensors based on mechanical contact, optical transmission or reflection, etc. Such sensors can be provided with the jaws themselves, or can be eternal to them.

Centering of the pouch top seal with respect to the grasper jaws can be achieved if the grasper can sense the center of the pouch (e.g., using an optical reflectance sensor to find a marking on or near the top seal, or using an optical transmission sensor to detect the side edge of the pouch near the top (the cubby can be designed to allow for this).

Sensing

To provide highly-reliable dispensing, various sensors can be used. For example, sensors (e.g., bi-cell photodiodes) can be incorporated into the dispenser to allow the kiosk to sense the position of the left and right vertical edges of the pouch or pouch flaps as they are entering the dispenser, and adjust the position (by translating the grasper) to center the pouch within the dispenser; this can supplement sensors used to improve centering of the pouch when it is grasped. Preferably one sensor is used near each pouch edge, thus allowing a center measurement to be made regardless of pouch width. A center away from the pouch edges (e.g., at the pouch center) can also be used, if markings or other features are provided in that region.

As the pouch is lowered into the dispenser, a sensor (e.g., optical transmissive) can be used to detect the bottom (or top edge) of the pouch, thus allowing the controller to lower the pouch by an amount that places its flap at the optimal height to allow separation and/or grasping. To verify that the flaps, once separated, have entered between the upper and lower clamps (114 and 116 of FIG. 8(i) of the 563 filing) sufficiently parallel and with sufficient depth to ensure reliable clamping, sensors may be incorporated into the clamps or nearby. For example, each pair of clamps may include two mechanical or optical sensors spaced a distance apart: when both sensors are triggered by a flap, then the clamp may close.

While peeling open a pouch, the tension may be monitored (e.g., by the reading of a potentiometer which is actuated by the position of the flap, or by web tension sensors known to the art of converting) to determine when the peeling front has reached a point (e.g., at a reinforced region) where peeling should be stopped, at least temporarily. If the seal is tapered in width, the tension associated with peeling with vary with location, so tension monitoring can also be used to approximately determine that location.

It is possible that the pouch wall will tear/shred during peeling. This can be detected by various methods such as passing the pouch against an air knife (or "vacuum knife"), and monitoring the pressure or vacuum level: any gap in the film will reveal itself. In some embodiments the blades can include slots which also serve this purpose. The knife may be located between the peeling front and the blades, and if a protective film is used (to prevent contamination of the dispenser in case of a tear), in can be on the inside of this film, adjacent to the pouch wall. Other approaches to detecting tears include a) monitoring tension (and comparing it to the expected tension: tension may be reduced when shredding vs. peeling, and tension may abruptly decrease as shredding begins); b) acoustic signature; c) visual inspection (e.g., using a camera and machine vision, or detecting light from an LED passing from one side to the other (preferably using a wavelength that both pouch walls attenuate).

If shredding is detected, a) dispensing can be halted and the pouch released from the dispenser into a waste bin; b) the protective film, if supplied by one roll and collected by another, can be advanced to a clean area (potentially contaminated portions can be cut off and also dropped into the bin). The film can also be changed when any contamination on it is detected, or regularly, for preventative maintenance.

Sensing of people near the kiosk can be achieved using cameras, low-cost radar (e.g., OmniPresense, San Jose, Calif.), LI DAR, etc. Anonymous information about patron behavior may be collected for analysis, such as helping to optimize the user experience. Additionally, threats to or abuse of the kiosk can be detected by detecting rapid motion of people or limbs toward the machine, detecting blows using accelerometers, etc. In such cases, photos or videos of the people involved may be taken and recorded and/or transmitted. Also, face scanning or other biometric techniques may be used (e.g., on an opt-in basis) to help recognize enrolled customers and streamline their experience obtaining food.

Kiosk Formats

A kiosk equipped with multiple dispensers can be used at least two ways: 1) a single dish can be moved from dispenser to dispenser, alternating between the two, with each dispenser pre-loaded with a pouch when not in use: this speeds up making one meal; 2) each dispenser can make an entire meal, doing so simultaneously (this may be best to serve two customers eating at the same time). If the transport mechanical that moves the dish allows for movement from dispenser to dispenser, a kiosk might be able to operate in both modes, depending on the need.

Kiosks may have sub-units which can separate from the main unit and then move (e.g., fly, roll, sail) autonomously, semi-autonomously, or remotely-controlled) to get closer to a customer. Such a sub-unit or delivery vehicle can (if equipped with pouches and dispenser(s), assemble a meal en route to the customer, or simply deliver a meal that has been assembled by the kiosk. Also, kiosks may have sub-units which detach and move to a resupply vehicle or facility, delivering modules which are empty or carrying expired pouches, and returning with modules containing fresh pouches. Alternatively, the entire kiosk may move to a restocking building, vehicle, or area to pick up ingredients, discharge waste, etc. Both sub-units and entire kiosks can be used to deliver meals (e.g., door to door in office, hotel, apartment, factory, hospital, etc.), summoned by a mobile app, preparing food as it travels or delivering food already prepared, then returning to a dock to recharge batteries, restock with ingredients, and discharge waste. Driverless vehicles which roll on streets or fly can also deliver meals (optionally preparing them en route) by docking with cars, trucks, and other vehicles while they are stopped or even while they are moving, in the latter case matching their speed to the vehicle before doing so.

FIG. 16 depicts in cross-sectional elevation view an airplane fuselage 240 (though a train, boat, Hyperloop vehicle, or submarine may be similarly arranged) having floor 242 and aisle 244, wherein tracks are provided along the ceiling along which travelling shuttles containing meals, snacks, and beverages may be transported to and from a section of the vehicle (e.g., at the rear) in which food and drinks are prepared. Thus, modules may be loaded onto an aircraft, for example, and a specially-designed kiosk/galley may assemble food and drink (heating or perhaps cooking ingredients as needed) automatically from fresh ingredients; such food and drink can then be transported along the tracks to passengers. This approach provides for better-tasting, fresher, and more healthful food, and also avoids the need for a rolling cart that flight attendants normally use to serve customers. The entire process can be automated: a passenger can order an item from a screen at her seat location, the item is then prepared in the robotic galley, and then delivered to her in the shuttle. The figure depicts locations (A, B, C) for such shuttles which can minimize interference with passenger activity and are least likely to encounter a passenger's head. For example, location A is above seats 246. However, shuttles can be equipped with sensors which detect an impending collision (e.g., with a passenger) (or sensors can be installed within the cabin) and stop the shuttle well before it can occur (also possibly warning the passenger). The system may also avoid collisions by detecting when a passenger has unbuckled her seatbelt in preparation for getting up from her seat, and pause shuttle motion if there's risk of collision. If the shuttle is already overhead or about to be, the seatbelt can be locked, preventing unbuckling until the shuttle has passed.

Figure 17A:
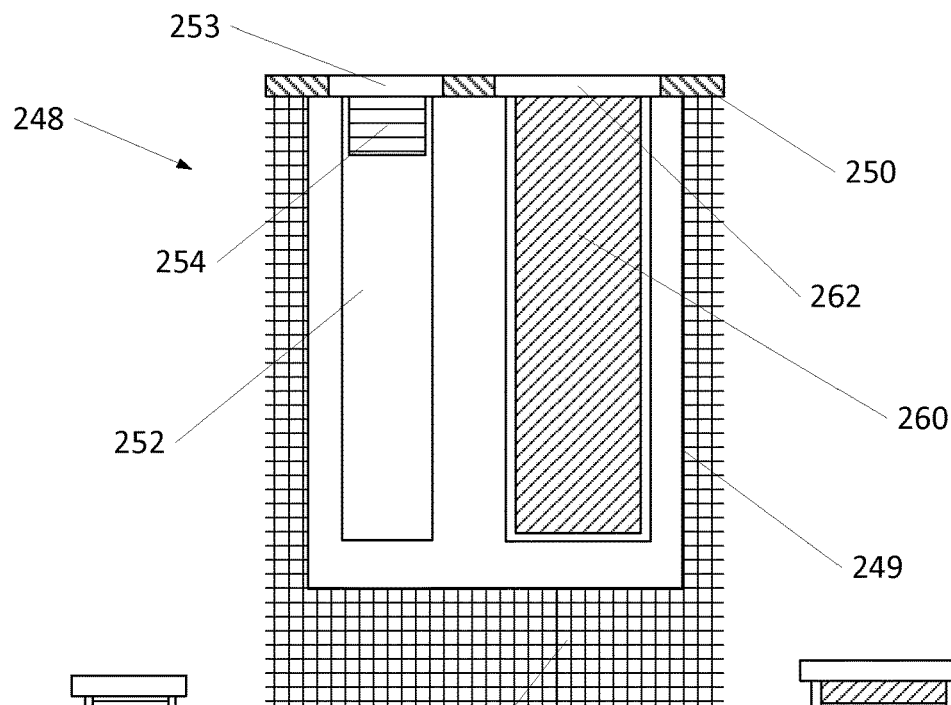
FIGS. 17A-17C illustrate an underground food machine.
Figures 17B, 17C:
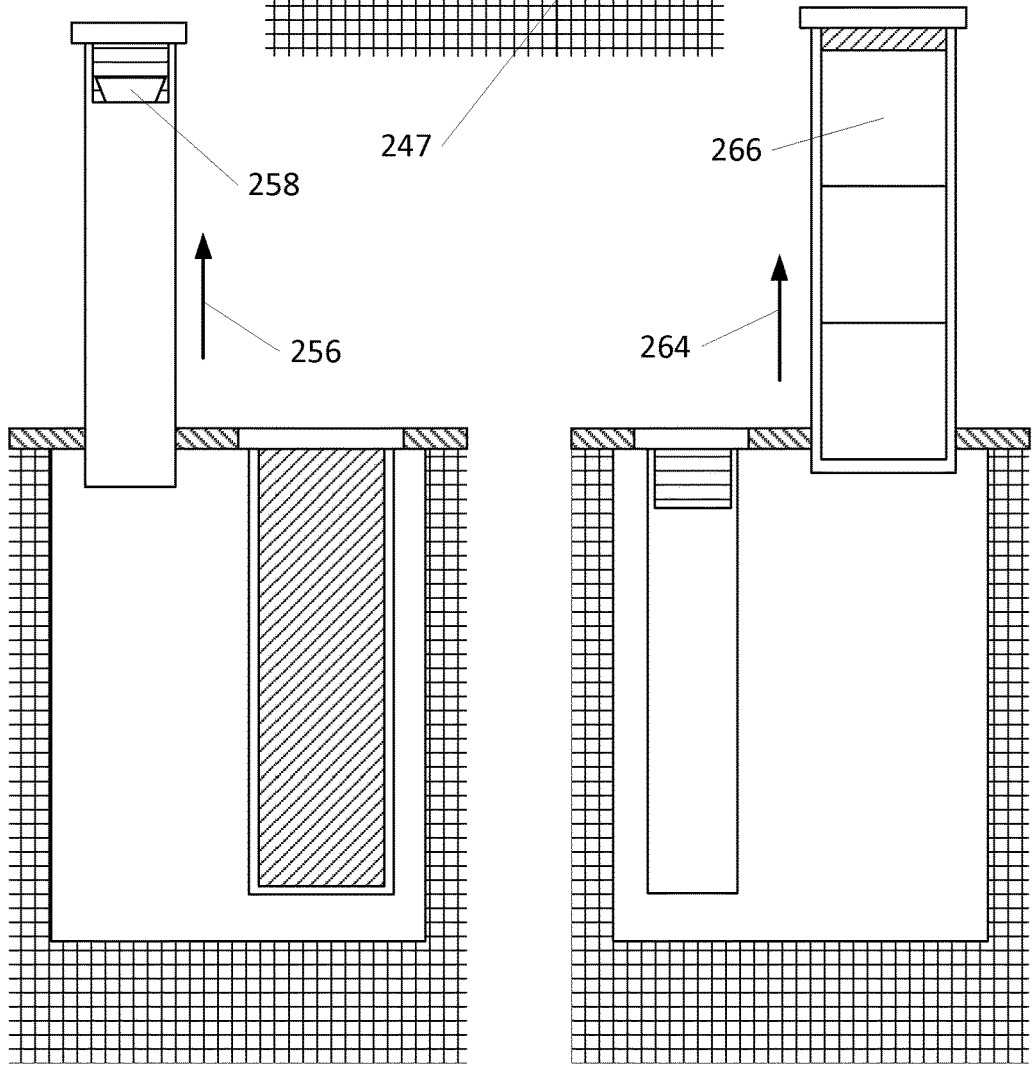

FIGS. 17A-17C depict elevation views of a sealed kiosk which can be buried underground in soil 247 or other material (e.g., in residential neighborhoods where an above-ground kiosk might be unsightly and objectionable), and which can be provide meals and be restocked. Such kiosks can be connected to the electrical grid or otherwise powered, and their underground location can help keep ingredients cold. In FIG. 17A, kiosk 248 with enclosure 249 is shown in its normal, unobtrusive state, during which it can be preparing a meal for a customer based on ingredients stocked within. The top of the kiosk may be approximately flush with the surrounding ground material 250 (asphalt, grass, etc.) A customer may place an order (e.g., using a mobile app) and when the order is ready to be picked up, he can approach the kiosk on foot, or by bicycle, car, or other vehicle. When the kiosk senses (e.g., via geofencing) that the customer is near, meal cylinder 252 topped with meal cylinder cap 253 and comprising meal compartment 254 can rise as shown by arrow 256 in FIG. 17B, raising meal 258 loaded into the compartment by the system, to a convenient height for retrieval by the customer, after which the cylinder quickly retracts. In a similar manner, the kiosk may be restocked by either raising restock tube 260 equipped with restock cap 262 as shown by arrow 264 in FIG. 17C to a height where it can conveniently be loaded with ingredient-containing modules 266. Alternatively, modules may simply be lowered into a bay within the kiosk (e.g., by a driven or driverless restocking vehicle) that passes over the kiosk (especially for a kiosk buried in a roadway).

Assuming it is possible to know very accurately how long it will take to prepare a meal, and given it is possible to track a customer's location while she makes her way to a kiosk to retrieve the meal, then a customer may retrieve a meal while temporarily stopped (e.g., at a red light) or after pulling over to a curb. An underground kiosk having a pop-up meal cylinder or similar as in FIG. 17A, or one in the form of an above-ground "mailbox" kiosk (though a portion of it may be underground) alongside which one can park briefly to receive a meal through a vehicle window are among the possible formats. In some embodiments an arm may be provided that can extend through the vehicle window, e.g., possibly lowering the meal in a container onto the passenger-side seat, etc.

Ordering and Preparation Scheduling

In some embodiments the system can automatically suggesting substitutions when an ingredient isn't available currently or is in short supply or anticipated to be unavailable at a given kiosk.

Depending on the ingredients and required processing, automated food preparation can be highly deterministic and predictable in term of processing time due to the repeatability of machinery as compared to humans, thus allowing a very reliable completion time for the preparation process to be calculated based on available data, and enabling a customer to reduce waiting time at a food kiosk, if a meal is pre-ordered for pickup at a specific time, to virtually zero (especially if the meal is prepared slightly early and kept for him). However, in the case of ingredients which require processing (e.g., cooking) and vary considerably (e.g., the thickness of a steak), it may be impractical to determine processing time with the desired accuracy, especially while the ingredient is still packaged, and indeed, active sensing may be needed to determine when the ingredient is "done" and processing should be stopped. Nonetheless, the time to prepare a meal can be estimated, and the estimate updated dynamically as preparation progresses.

Figure 18:
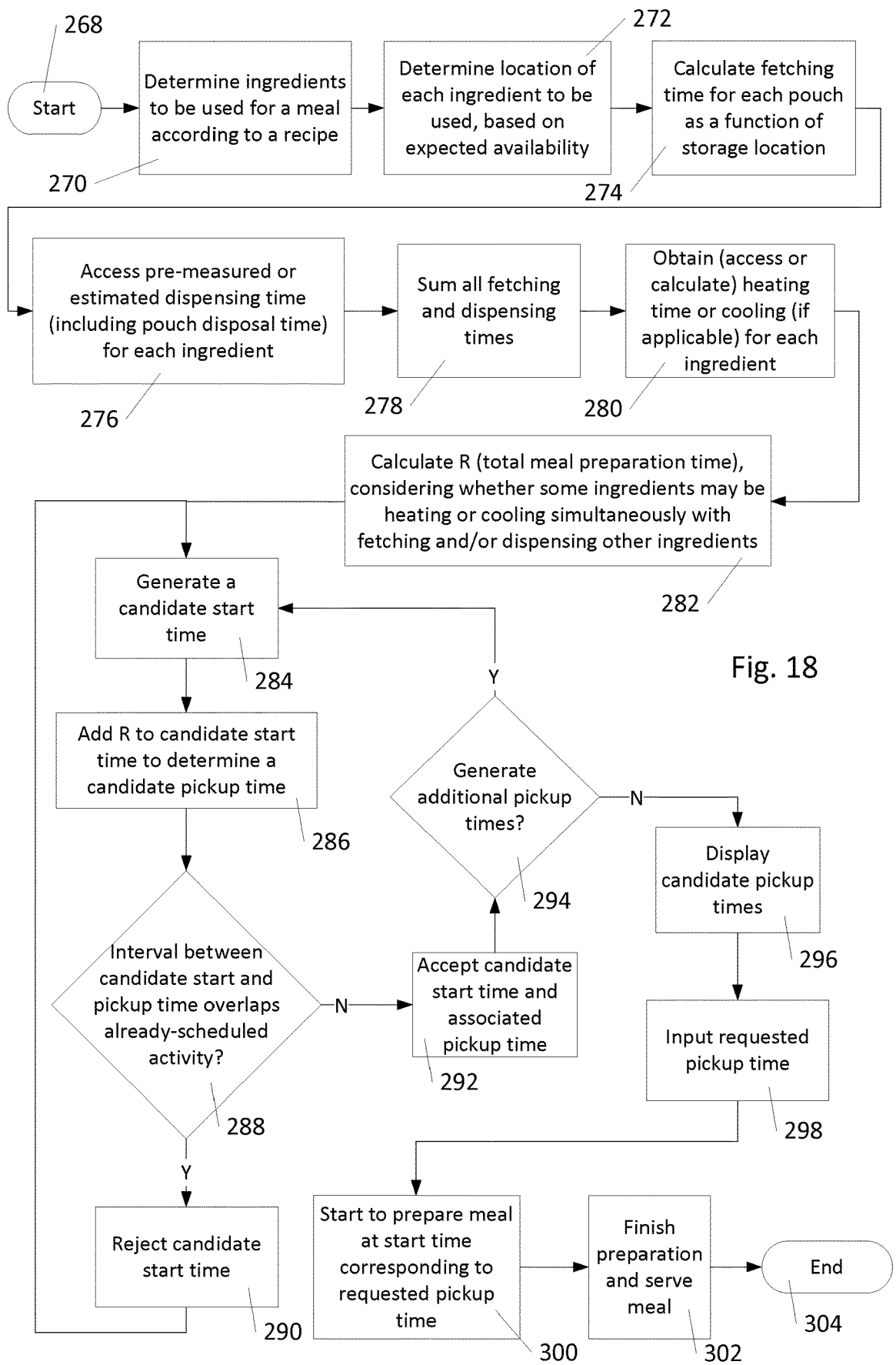
FIG. 18 shows a flowchart for a process to generate pickup times.

FIG. 18 depicts a flow chart for an algorithm that provides a customer with a list of available times for picking up a meal, and assumes a kiosk that does not have multiple copies of the hardware that may be needed to simultaneously prepare more than a single meal. The algorithm obtains the time R required to prepare the requested meal, and evaluates various pickup times to ensure that they do not cause an overlap in the preparation time for another order, displays the available pickup times, receives customer input of a preferred time P, and initiates meal preparation at a time that ensures delivery at the requested time.

In the figure, the process starts at 268, and at 270, the controller for the automated food system determines ingredients needed for a meal according to a selected recipe. In 272, the controller determines location within the kiosk of the ingredients likely to be used to prepare the meal (taking into account other orders), and in 274, the controller calculates the time required to fetch each ingredient, based on its distance from a dispenser or heating/cooling subsystem, etc. In 276, the controller accesses data that records the time needed for a particular ingredient to be dispensed (including the time to dispose of the empty pouch), if available, or if not, makes an estimate. In 278, the fetching and dispensing times for all ingredients are summed, while in 280, the controller accesses data describing the heating or cooling time for any ingredients needing heating/cooling if available, or if not, performs a calculation (or estimate). In 282, the controller calculates R, the total meal preparation time for a given meal, taking into account whether heated/cooled ingredients can be heated/cooled simultaneously with one another, or while other ingredients are being fetched and/or dispensed. In 284, the controller generates a candidate start time (e.g., initially, the current time), and in 286, the controller adds the value R to the candidate start time to obtain a candidate pickup time. In 288, the controller assesses whether the interval between the candidate start and pickup times would overlap an activity the system is already scheduled to perform (e.g., preparing a meal for another customer). If it does, then in 290, the start time is rejected and the process returns to 284. If it does not, then the candidate start time and its associated pickup time is accepted in 292. In 294, the controller determines whether it should generate additional candidate start times, and if so, it does so in 284. If not (e.g., there are enough times generated already), then in 296 the controller displays all available pickup times and waits for user input. In 298, the controller inputs the customer's requested pickup time and when the start time corresponding to that pickup time arrives, starts the process of preparing the customer's meal in 300. In 302, the controller completes the preparation and serves the meal, and in 304, the process ends.

To the extent there is uncertainty about the value of R, the controller can add a "fudge factor" to it, such that if the preparation process takes less than the sum of these values, the meal will be ready slightly early. In some cases, a start time may be acceptable even if would normally overlap another activity if rejecting the start time would mean the system is unnecessarily idle; the effect of the overlap may be to slightly delay the end of the overlapped activity. For example, if preparing a particular meal is expected to take two minutes but the interval between two scheduled activities is only 90 seconds, the start time might be accepted if the only consequence is to potentially delay the completion of the later activity by 30 seconds, or starting the earlier activity 30 seconds earlier in order to provide a "window" to prepare the meal.

In some embodiments, an automated food preparation kiosk has multiple copies of hardware subsystems allowing it to simultaneously produce meals, or at least do parallel processing of components of a single meal or of multiple meals (e.g., heating multiple pouches in a DCI P apparatus or microwave oven). Full parallelism is one option, and interleaved, time-sharing parallelism another. In the latter, the controller might, for example, prepare two meals A and B such that they're ready at approximately the same time, by interleaving various process steps: the first ingredient of meal A might be fetched and dispensed, followed by the first ingredient of meal B, followed by the second ingredient of meal A and the second of meal B, etc.

In some embodiments, the controller or a server connected to it may not wait until a customer requests available times for pickup, but continuously update available meal times and make them available (e.g., on a kiosk display screen, or over a network through a mobile app or on a website). The calculation of available times may be initiated by detecting the presence of a prospective or known customer near the kiosk, etc. In some embodiments, rather than offer customers a set of available pickup times, the customer may be allowed to propose a preferred time and the controller or server will determine whether or not it can accommodate that time, and if not, propose alternative times.

In some embodiments the controller or server applies a buffer interval between all scheduled meal preparation intervals, to allow for any variations in customer arrival time or machine processing time, though there is less opportunity to do so during periods of peak demand (e.g., lunchtime).

Figure 19A:
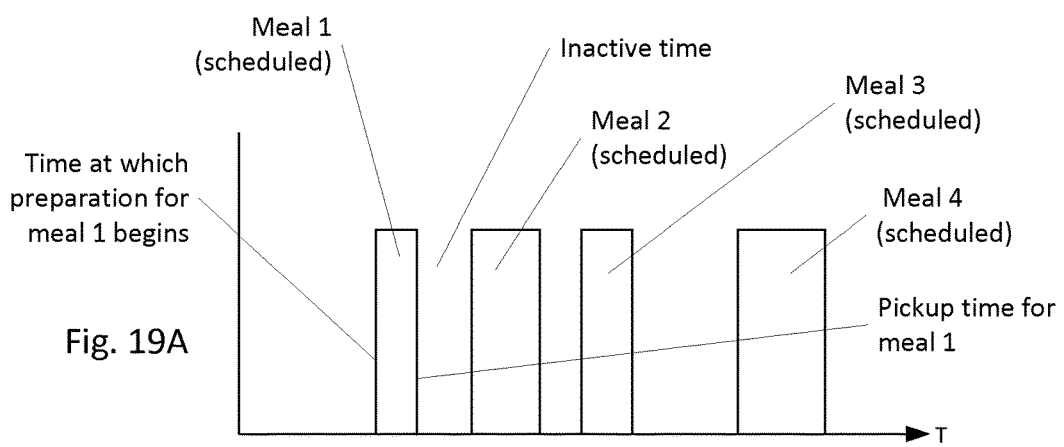
FIGS. 19A-19B depict timelines associated with delaying meal preparation.
Figure 19B:
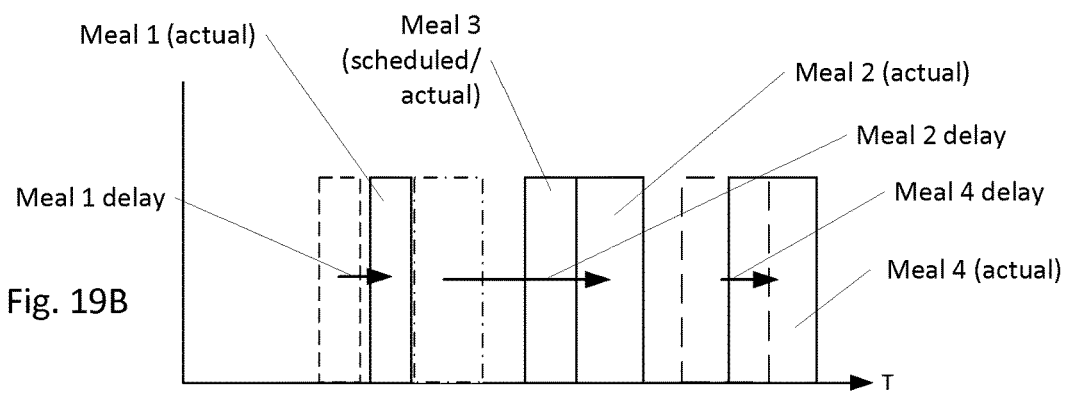
Figure 19C:
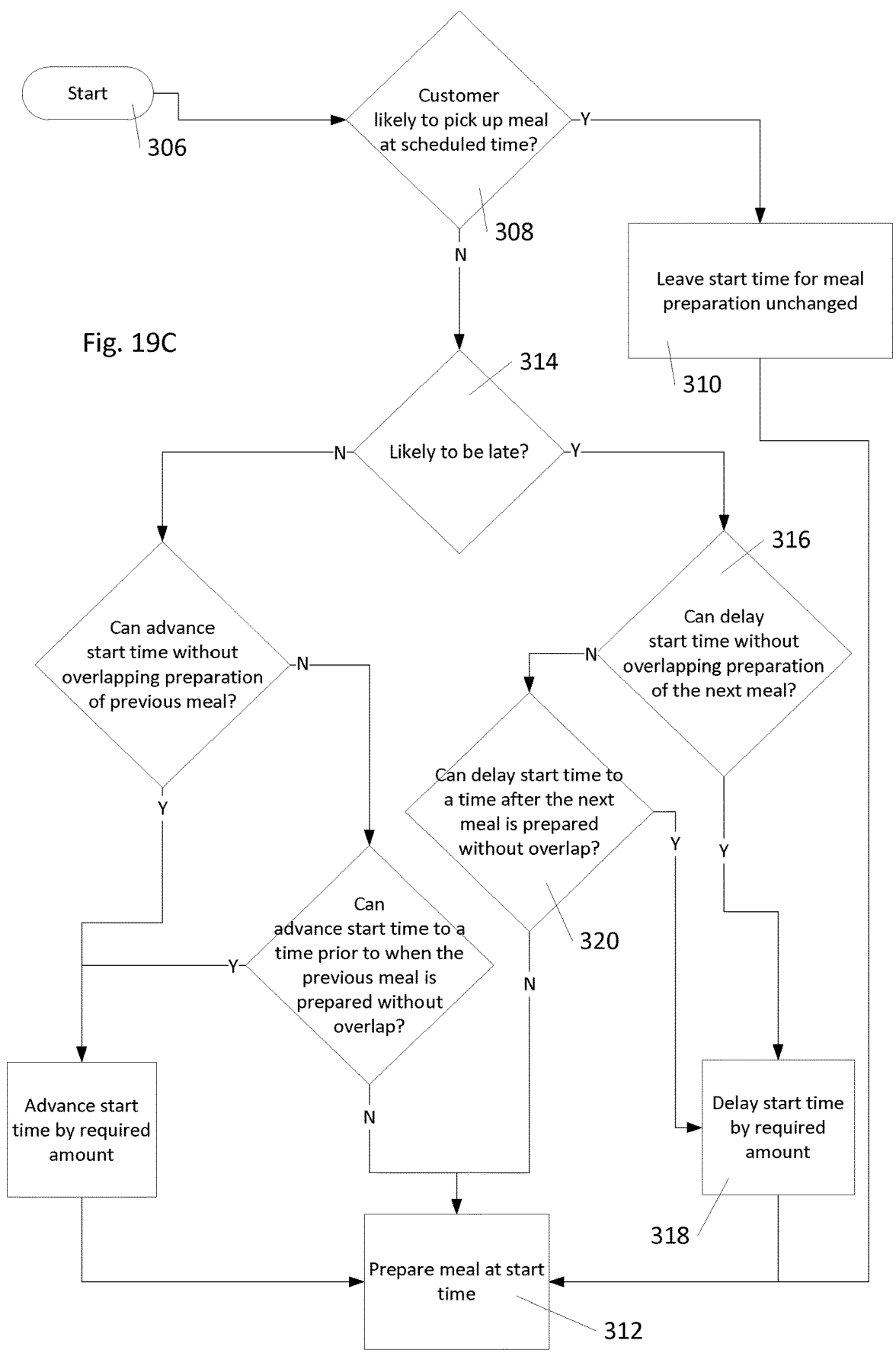
FIG. 19C shows a flowchart associated with FIGS. 19A-19B.

FIGS. 19A-19C depict an approach, based on an algorithm, for adjusting meal preparation times if a customer selects a pickup time but then is late or early to pick up the meal. While the kiosk may be provided with spaces to hold meals ready to serve but not yet picked up (such spaces can be refrigerated or kept warm, for example), whenever possible it is preferred to delay the start of preparation if it is determined that pickup will likely be delayed. It is also desirable to advance the start (and end) of preparation if early pickup appears likely. Determining the likely pickup time can be the result of communication with the customer, determining the customer's location using GPS (e.g., geofencing or use of other sensors if the customer is near the kiosk) and taking into account average speed, traffic conditions, etc., sensing that the customer has arrived (e.g., at a gas station, by commencement of paying for gas at the pump), or at baggage claim, taking into account a customer's flight arrival time, distance to baggage claim from his gate, seat on the plane, etc. Confirming with the customer that he wishes to modify the pickup time may be desirable, of course.

FIG. 19A shows scheduled times for preparing meals 1-4, according to their requested pickup times. Bars of different width indicate different preparation times for different meals. Inactive times between meal preparation are shown; these are times during which a meal can be prepared if the pickup time is delayed, in some cases. In FIG. 19B, Meals 1, 2, and 4 have been delayed in their preparation times due to the pickup times being adjusted, while Meal 3 is prepared and picked up at its originally-scheduled time. The start of Meal 1 has been delayed such that is preparation occurs just before the scheduled preparation time for Meal 2. Meanwhile, the pickup time for Meal 2 has been delayed so much that it cannot be shifted later by a small amount, as it would overlap the preparation time for Meal 3 (assuming the system cannot prepare more than one meal at a time and Meal 3's preparation interval doesn't change); instead, it is shifted to an inactive interval after the preparation of meal 2. Meal 4, meanwhile, is shifted slightly later as a result of a later pickup. Similarly, it is possible that the customer is likely to arrive before her pickup time. If so, then the start time can be advanced accordingly, again, if applicable, ensuring there is no overlap between the preparation of one meal and another.

FIG. 19C depicts a flowchart that governs the behavior of the controller (or a networked server) described in FIGS. 19A-19B. The process starts at 306, and at 308, the controller determines whether the customer is likely to pick up on time. If the result is "yes", then in 310 the start time is left unchanged and in 312, the meal is prepared at the (unchanged) start time. If the result in 308 is "no", the controller further determines in 314 whether the customer is likely to be late. If the result is "yes" (i.e., late, not early), then in 316 the controller determines whether it can delay the start time by the expected amount without overlapping preparation of the next-scheduled meal. If the result is "yes", then in 318, the start time is delayed by an appropriate amount. If the result is "no", then in 320 the controller determines whether it is possible to delay the start time further, so that the preparation interval is after the preparation of the next scheduled meal. If the expected delay is large enough, the scheduled start time may be pushed out after several scheduled meals are prepared. The controller also may evaluate whether, depending on the particular meal (e.g., cold, room temperature, hot, type of food) it is preferable to prepare the food on time or delay it only by the amount it can easily be delayed, and then store it for the customer, rather than schedule a start time that may be too far in the future, causing the customer to wait. In FIG. 19C, a similar, but complementary process flow occurs if the result of the assessment in 314 is "no", on the left side of the flowchart. Not shown in FIG. 19c is a box representing the end of the process.

Management of Bad Ingredients

Figure 20:
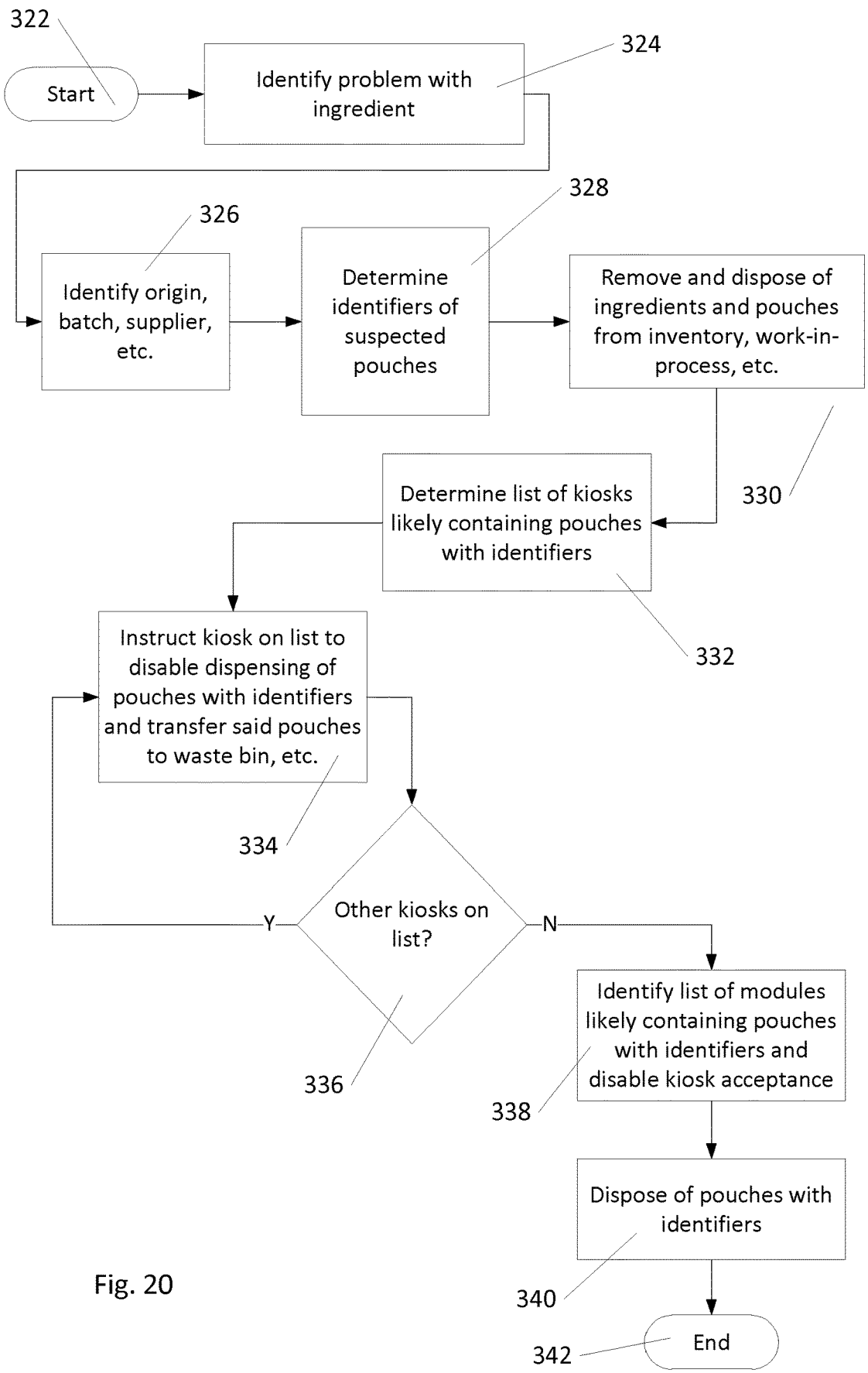
FIG. 20 depicts a flowchart for a process to manage bad ingredients.

FIG. 20 depicts a flowchart representing an algorithm for managing a situation in which a bad (e.g., poor quality, disease-bearing) ingredient has been identified, to prevent any customer from being served that ingredient. Blockchain technology may be used to identify the batch, supplier, and other relevant information needed to implement this process. A server in communication with at least some of the kiosks in the network can execute the algorithm should in the figure. The process starts at 322, after which the server identifies a problematic ingredient in 324, and then (e.g., through blockchain) identifies its provenance in 326 and determines in 328 which identifiers (bar codes, serial numbers, etc.) may be used to detect pouches likely to contain the bad ingredient. In 330, the server can notify personnel in manufacturing (or directly intervene) so as to ensure that the designated pouches are removed from inventory, work-in-process, etc. Also, in 332, the server can determine which kiosks likely contain identified pouches and in 334, remotely instruct a kiosk to disable dispensing of such pouches and transfer them to the kiosk's internal waste bin. In 336 the server determines if there are other kiosks so affected, and instructs them in 334 if needed. In 338, the server identifies modules (of the kind in FIG. 12A) which are likely affected and notifies the module (if wirelessly connected) and/or the kiosk to which it is being transported to refuse to accept the module.

Miscellaneous

FIG. 21A and FIGS. 21B-21E depict elevation views of a sequence for automatically inserting a toothpick or similar item into a sandwich or other food item, in a non-contact fashion (i.e., without any direct contact between food and apparatus, the only contact being between the toothpick and the food). In the elevation view of FIG. 21A, sandwich 344 is shown in dish 346, with toothpick dispenser 348 nearby. FIG. 21B shows the dispenser in plan view: it comprises a cylinder 350 filled with toothpicks 352, piston 354 (e.g., spring-loaded) to push the toothpicks toward rotating wheel 356 which comprises a notch that can receive one toothpick at a time such as toothpick 358. Rotation of the wheel as shown by arrow 360 introduces a toothpick into an area where it can be pushed into the food item using suitable pusher 362 (e.g., solenoid). In FIG. 21C, the food item has moved as shown by arrow 364 below pusher 362, while in FIG. 21D, the pusher has pushed the toothpick, causing it to descend as shown by arrow 366 and impale the food item. Finally, in FIG. 21E, the dish has moved away from the dispenser as indicated by arrow 368, and the item, skewered by and held together by the toothpick, is ready to serve. In the case of a sandwich cut in half, two toothpicks may similarly be inserted.

In some embodiments a set of double doors (e.g., an airlock) is provided through which a completed meal can be provided to a customer. Such an arrangement prevents customers from reaching into dangerous or tamper-able parts of the kiosk, and can also be used to avoid vermin from entering the machine (the inner door may only be opened if no insects or other vermin are detected in the space between the inner and outer doors).

A salad tossing station may be provided in a kiosk for salads. After dressing is dispensed and a lid is applied to a bowl, the bowl and lid may be tumbled, shaken, inverted, etc. to dispense the dressing over the salad ingredients. The lid is preferably not clear since it will likely be unaesthetic after such handling.

In some embodiments dispensers can accommodate pouches of variable widths (e.g., smaller pouches suitable for spices, condiments (e.g. mustard, mayo, ketchup), sauces, etc.). For example, FIGS. 47(a)-(c) of the 563 filing depict a dispenser which can accommodate such variable-width pouches.

Food preparation instructions may be partitioned between digital recipes and ingredient handling data (which may be generic or specific to a particular ingredient batch or individual pouch). Ingredient handling data may be stored in a database, encoded within ingredient packaging, etc.

Controller

The control of the apparatus and the implementation of the methods and steps described herein may be achieved using hardware, software, or any combination thereof, together forming a controller or control system. The term "hardware" may refer to either one or more general or special purpose computers; microcontrollers; microprocessors; programmable logic controllers (PLCs); programmable automation controllers (PACs); embedded controllers; or other types of processor, any of which may be provided with a memory capability such as static or dynamic RAM (random access memory); non-volatile memory such as ROM (read only memory); EPROM (erasable programmable read only memory), or flash memory; magnetic memory such as a hard drive; optical storage media such as CD (compact disc) or DVD (digital versatile disc); etc. The term may also refer to a PAL (programmable array logic) device, an ASIC (application specific integrated circuit), an FPGA (field programmable gate array), or to any device capable of processing and manipulating electronic signals.

The term "software" may refer to a program held in memory, loaded from a mass storage device, firmware, and so forth. The program may be created using a programming or scripting language such as C, C#, C++, Java, Python, PHP, JavaScript, LabVIEW, MATLAB, or any other programming or scripting language, including structured, procedural, and object oriented programming languages; assembly language; hardware description language; and machine language, some of which may be compiled or interpreted and use in conjunction with said hardware.

The control system may serve to load files, perform calculations, output files, control actuators such as motors, voice coils, solenoids, fans, and heaters, and acquire data from sensors, to automate or semi-automate apparatus which can implement the methods and steps described herein. Each method described herein, including any sequential steps that may be taken for the method's implementation and any modification of the behavior of the apparatus or control system as a result of human or sensor input, as well as combinations of such methods, may be implemented and performed by the control system, executing a program, or code, embodied in the control system. In some embodiments, multiple control systems may be employed, and portions of the functionality of the control system may be distributed across multiple pieces of hardware and/or software, or combined into a single piece of hardware running a single piece of software.

Terminology

The term "ingredient" or "ingredients" refers to one or more distinct, edible food items used in the preparation of an item to be consumed, and the term "food product" or "food products" refers to one or more edible food items ready to be consumed. The singular and plural forms of both phrases may be considered interchangeable, and the phrases themselves may not always be strictly applied herein and may be considered at least in some situations to be interchangeable.

The term "pouch" generally refers to a flexible package comprised of one or more materials in film form such as polymers and/or metals, but may be understood in some cases to refer to other containers, including ones which are more rigid.

The term "vessel" generally refers to a container able to hold ingredients/food products for purposes of storage, processing delivery/presentation/consumption, etc. and may be interchanged in many cases with other containers having similar functionality.

The term "dish" generally refers to a receptacle or vessel for serving or eating or drinking food, such as bowls, plates, cups, mugs, and glasses.

The term "meal" generally refers to one or more food items delivered for consumption, possibly involving processing of various kinds, and can include snacks and beverages.

"Proximate" or "in proximity to" generally refers to close enough to achieve the required functional purpose, for example, in the context of a dispenser or dispensing system, it refers to a distance comparable to a dimension of a typical pouch and more preferably within a smaller distance.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature.

General

Figures within this application are not necessarily to scale.

Motions are considered relative. Thus, if object A moves relative to object B which is at rest, the equivalent effect of object B moving relative to object A which is at rest is also contemplated in the disclosure.

It will be understood that particular embodiments described herein are shown by way of illustration and not as limitations of the disclosure. The principal features of this disclosure can be employed in various embodiments without departing from the scope of the disclosure. Those skilled in the art will recognize, or be able to ascertain using no more than routine experimentation, numerous equivalents to the specific procedures described herein. Such equivalents are considered to be within the scope of this disclosure and are covered by the claims.

It is intended that the aspects of the invention set forth herein represent independent invention descriptions which Applicant contemplates as full and complete invention descriptions that Applicant believes may be set forth as independent claims without need of importing additional limitations or elements, from other embodiments or aspects set forth herein, for interpretation or clarification other than when explicitly set forth in such independent claims once written. It is also understood that any variations of the aspects set forth herein represent individual and separate features that may form separate independent claims, be individually added to independent claims, or added as dependent claims to further define an invention being claimed by those respective dependent claims should they be written.

In view of the teachings herein, many further embodiments, alternatives in design and uses of the embodiments of the instant invention will be apparent to those of skill in the art. As such, it is not intended that the invention be limited to the particular illustrative embodiments, alternatives, and uses described above but instead that it be solely limited by the claims presented hereafter.

The invention claimed is:

1. A method for determining one or more candidate meal pickup times for a user of an automated food system and automatically determining a meal preparation start time corresponding to a user-requested meal pickup time, comprising:
(a) providing an automated food system, comprising:
(1) A memory for storing:
(i) information about meals that may be produced by the system;
(ii) information about ingredients needed to produce the meals;
(iii) process parameters used to process the ingredients to produce the meals;
(iv) information about the state of the system, the state of the ingredients, and existing scheduled activities;
(2) A supply of packaged ingredients to produce the meals;
(3) Automated apparatus for manipulating the ingredients in the process of producing the meals;
(4) At least one container for holding at least one item selected from the group consisting of: (1) the ingredients for a selected meal, (2) a partially prepared meal, and (3) a prepared meal;
(5) A controller for controlling operation of the system;

(b) receiving input from a user indicating interest in a selected meal;
(c) accessing from the memory information about the ingredients of the selected meal;
(d) determining a fetching time for each ingredient;
(e) determining a dispensing time for each ingredient based at least in part on pre-measured estimates of depositing time along with pause times and packaging disposal times;
(f) for any ingredient needing heating or cooling determining a heating or cooling time for each ingredient and for each combined state of the ingredients;
(g) determining any delay times associated with scheduled system activities based at least in part on stored existing scheduled system activities;
(h) calculating total meal preparation time R, by summing the results of (d)-(g);
(i) generating at least one candidate meal pickup time based on R in combination with a time selected from the group consisting of: (1) a current time, and (2) an approximate meal time of interest provided by the user;
(j) displaying the one or more candidate meal pickup times to the user;
(k) receiving a requested meal pickup time from input provided by the user;
(l) scheduling a meal preparation start time based at least in part on R and the requested meal pickup time such that the user is provided with a reliable meal pickup time, wherein at least one of the receiving, accessing, determining, calculating, generating, displaying, receiving, and scheduling steps are directed by the controller.

2. The method of claim 1 wherein the receiving input from a user further comprises a particular variation of that selected meal.

3. The method of claim 1 wherein the receiving input from a user further comprises information concerning an approximate meal pickup time of interest.

4. The method of claim 1 wherein the accessing from the memory further comprises information about a particular variation of a meal.

5. The method of claim 1 wherein the determining a fetching time is based at least in part on an order of fetching provided from the memory storing process parameters.

6. The method of claim 1 wherein the system ensures that no two meals utilize the same machine resources at the same time.

7. The method of claim 1 wherein the determining of fetch time for each ingredient is based at least in part on anticipated ingredient locations as derived from information selected from the group consisting of (1) current ingredient locations as stored in memory, (2) current ingredient locations as ascertained by scanning one or more potential ingredient locations, and (3) anticipated repositioning of ingredient locations resulting from existing meal orders.

8. The method of claim 1 further comprising delaying the start time if the user is not able to access the automated food system at or within a short time after the requested pickup time.

9. The method of claim 8 wherein the amount of the delaying is calculated so as not to overlap any previously-scheduled meal preparation interval.

10. A method for determining one or more candidate meal pickup times for a user of an automated food system and automatically determining a meal preparation start time corresponding to a user-requested meal pickup time, comprising:

(a) providing an automated food system, comprising:
(1) A memory for storing:
(i) information about meals that may be produced by the system;
(ii) information about ingredients needed to produce the meals;
(iii) process parameters used to process the ingredients to produce the meals;
(iv) information about the state of the system, the state of the ingredients, and existing scheduled activities;
(2) A supply of packaged ingredients to produce the meals;
(3) Automated apparatus for manipulating the ingredients in the process of producing the meals;
(4) At least one container for holding at least one item selected from the group consisting of: (1) the ingredients for a selected meal, (2) a partially prepared meal, and (3) a prepared meal;
(5) A controller for controlling operation of the system;
(b) receiving input from a user indicating interest in a selected meal;
(c) accessing from the memory information about the ingredients of the selected meal;
(d) determining a fetching time for each ingredient;
(e) determining a dispensing time for each ingredient based at least in part on estimates of depositing time along with pause times and packaging disposal times;
(f) for any ingredient needing heating or cooling determining a heating or cooling time for each ingredient and for each combined state of the ingredients;
(g) determining any delay times associated with scheduled system activities based at least in part on stored existing scheduled system activities;
(h) calculating total meal preparation time R, by summing the results of (d)-(g);
(i) generating at least one candidate meal pickup time based on R in combination with a time selected from the group consisting of: (1) a current time, and (2) an approximate meal time of interest provided by the user;
(j) displaying the one or more candidate meal pickup times to the user;
(k) receiving a requested meal pickup time from input provided by the user;
(l) scheduling a meal preparation start time based at least in part on R and the requested meal pickup time such that the user is provided with a reliable meal pickup time, wherein at least one of the receiving, accessing, determining, calculating, generating, displaying, receiving, and scheduling steps are directed by the controller.

11. The method of claim 10 wherein the receiving input from a user further comprises a particular variation of that selected meal.

12. The method of claim 10 wherein the receiving input from a user further comprises information concerning an approximate meal pickup time of interest.

13. The method of claim 10 wherein the accessing from the memory further comprises information about a particular variation of a meal.

14. The method of claim 10 wherein the determining a fetching time is based at least in part on an order of fetching provided from the memory storing process parameters.

15. The method of claim 10 wherein the system ensures that no two meals utilize the same machine resources at the same time.

16. The method of claim 10 wherein the determining of fetch time for each ingredient is based at least in part on anticipated ingredient locations as derived from information selected from the group consisting of (1) current ingredient locations as stored in memory, (2) current ingredient locations as ascertained by scanning one or more potential ingredient locations, and (3) anticipated repositioning of ingredient locations resulting from existing meal orders.

17. The method of claim 10 further comprising delaying the start time if the user is not able to access the automated food system at or within a short time after the requested pickup time.

18. The method of claim 17 wherein the amount of the delaying is calculated so as not to overlap any previously-scheduled meal preparation interval.

19. A method for determining one or more candidate meal pickup times for a user of an automated food system and automatically determining a meal preparation start time corresponding to a user-requested meal pickup time, comprising:
  (a) providing an automated food system, comprising:
    (1) A memory for storing:
      (i) information about meals that may be produced by the system;
      (ii) information about ingredients needed to produce the meals;
      (iii) process parameters used to process the ingredients to produce the meals;
      (iv) information about the state of the system, the state of the ingredients, and existing scheduled activities;
    (2) A supply of packaged ingredients to produce the meals;
    (3) Automated apparatus for manipulating the ingredients in the process of producing the meals;
    (4) At least one container for holding at least one item selected from the group consisting of: (1) the ingredients for a selected meal, (2) a partially prepared meal, and (3) a prepared meal;
    (5) A controller for controlling operation of the system;
  (b) receiving input from a user indicating interest in a selected meal;
  (c) accessing from the memory information about the ingredients of the selected meal;
  (d) determining a fetching time for each ingredient;
  (e) determining a dispensing time for each ingredient based at least in part on estimates of depositing time along with packaging disposal times;
  (f) for any ingredient needing heating or cooling determining a heating or cooling time for each ingredient and for each combined state of the ingredients;
  (g) determining any delay times associated with scheduled system activities based at least in part on stored existing scheduled system activities;
  (h) calculating total meal preparation time R, by summing the results of (d)-(g);
  (i) generating at least one candidate meal pickup time based on R in combination with a time selected from the group consisting of: (1) a current time, and (2) an approximate meal time of interest provided by the user;
  (j) displaying the one or more candidate meal pickup times to the user;
  (k) receiving a requested meal pickup time from input provided by the user;
  (l) scheduling a meal preparation start time based at least in part on R and the requested meal pickup time such that the user is provided with a reliable meal pickup time,
wherein at least one of the receiving, accessing, determining, calculating, generating, displaying, receiving, and scheduling steps are directed by the controller.

* * * * *